US011855871B1

(12) United States Patent
Olden et al.

(10) Patent No.: US 11,855,871 B1
(45) Date of Patent: Dec. 26, 2023

(54) SYSTEMS, METHODS, AND STORAGE MEDIA FOR ANALYZING AUTHENTICATION AND AUTHORIZATION REQUIREMENTS IN AN IDENTITY INFRASTRUCTURE

(71) Applicant: Strata Identity, Inc., Niwot, CO (US)

(72) Inventors: Eric Olden, Niwot, CO (US); Carl Eric Leach, Carlsbad, CA (US); Christopher Marie, Denver, CO (US); Elias Friedman, Vancouver (CA)

(73) Assignee: Strata Identity, Inc., Niwot, CO (US)

( * ) Notice: Subject to any disclaimer, the term of this patent is extended or adjusted under 35 U.S.C. 154(b) by 0 days.

(21) Appl. No.: 18/339,125

(22) Filed: Jun. 21, 2023

Related U.S. Application Data

(60) Provisional application No. 63/354,291, filed on Jun. 22, 2022.

(51) Int. Cl.
*H04L 43/18* (2022.01)
*H04L 67/02* (2022.01)
*H04L 9/40* (2022.01)

(52) U.S. Cl.
CPC .............. *H04L 43/18* (2013.01); *H04L 63/08* (2013.01); *H04L 67/02* (2013.01)

(58) Field of Classification Search
None
See application file for complete search history.

(56) References Cited

U.S. PATENT DOCUMENTS

| 10,148,493 | B1* | 12/2018 | Ennis, Jr. | H04L 61/5014 |
| 10,511,630 | B1* | 12/2019 | Weiss | H04L 63/20 |
| 10,554,743 | B2* | 2/2020 | Scrivano | H04L 67/1063 |
| 11,750,615 | B1* | 9/2023 | Adda | H04L 63/1433 726/4 |
| 2010/0281159 | A1* | 11/2010 | Boscolo | H04L 63/20 709/224 |
| 2011/0004649 | A1* | 1/2011 | Nord | H04L 67/143 709/202 |
| 2017/0048350 | A1* | 2/2017 | Nord | H04L 67/306 |
| 2018/0278637 | A1* | 9/2018 | Kuperman | H04L 63/0884 |
| 2022/0100902 | A1* | 3/2022 | Juniper | H04L 63/0281 |

* cited by examiner

*Primary Examiner* — Quang N Nguyen
(74) *Attorney, Agent, or Firm* — Neugeboren O' Dowd PC

(57) ABSTRACT

Systems, methods, and storage media for analyzing authentication and authorization requirements in an identity infrastructure are disclosed. Exemplary implementations may: intercept, at a server, a first request to access an application in the identity infrastructure; transmit, from the server, one or more of the first request and a modified version of the first request to the application; intercept, at the server, a response from the application, based at least in part on the transmission; and display, via at least one interface, an analysis of one or more of the first request, the modified version of the first request, and the response, wherein the analysis comprising determining requirements for application authentication and authorization requirements, identity protocol(s) and/or techniques utilized by the application, whether user-defined security requirements have been implemented, and/or whether application meets predetermined compliance standards.

18 Claims, 13 Drawing Sheets

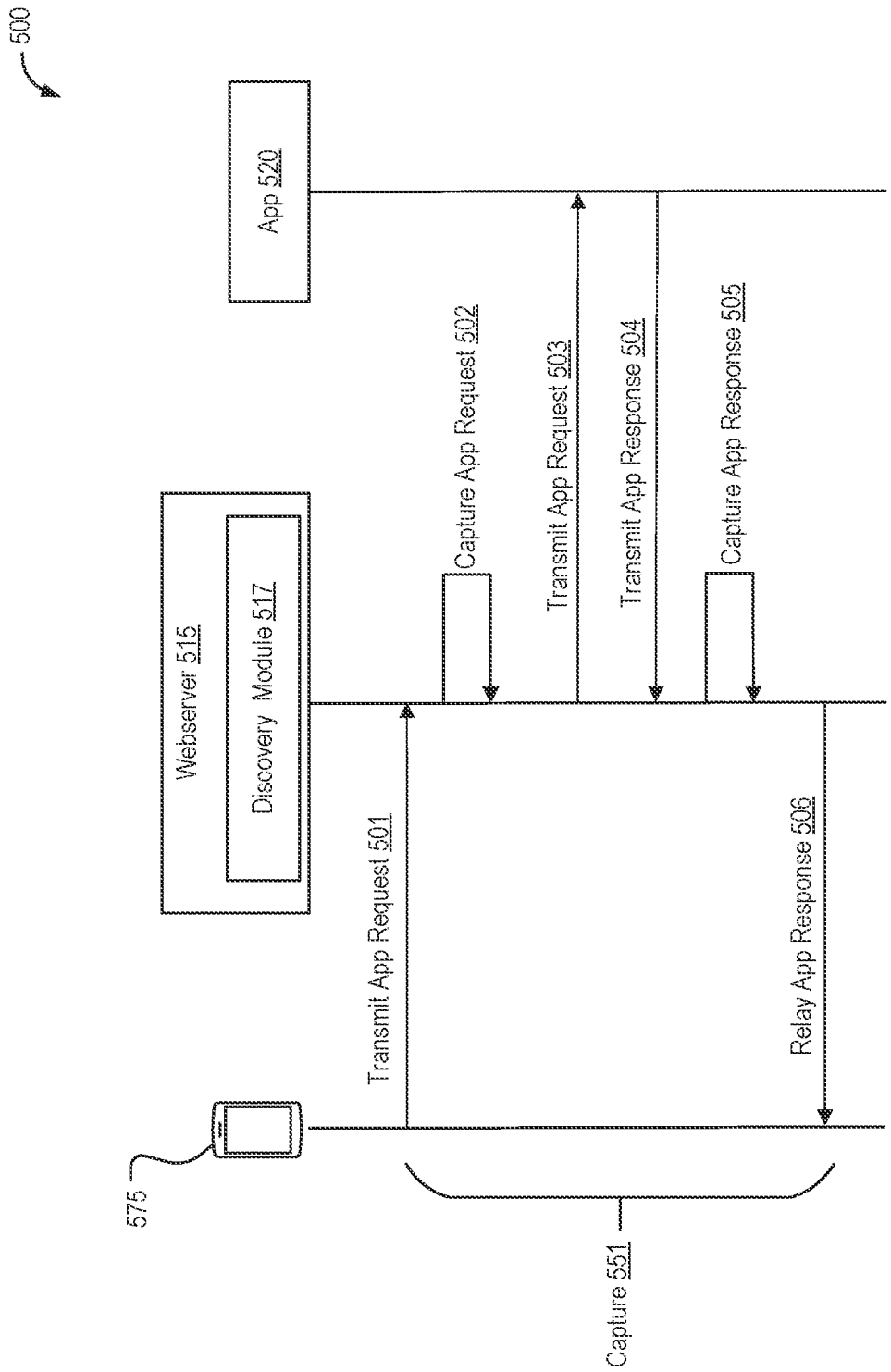

SYSTEMS, METHODS, AND STORAGE MEDIA FOR ANALYZING AUTHENTICATION AND AUTHORIZATION REQUIREMENTS IN AN IDENTITY INFRASTRUCTURE

CROSS-REFERENCE TO RELATED APPLICATIONS

The present Application for Patent claims priority to U.S. Provisional Application No. 63/354,291 entitled "Systems, Methods, and Storage Media for Analyzing Authentication and Authorization Requirements in an Identity Infrastructure," filed Jun. 22, 2022, assigned to assignee hereof, the contents of which are incorporated herein by reference in their entirety and for all proper purposes. The present Application for Patent is also related to U.S. application Ser. Nos. 17/345,470, 17/344,585, 17/341,597, 17/329,107, 17/317,156, and 17/217,422, assigned to the assignee hereof, the contents of which are incorporated herein by reference in their entirety and for all proper purposes.

FIELD OF THE DISCLOSURE

The present disclosure relates to systems, methods, and storage media for analyzing authentication and authorization requirements in an identity infrastructure.

BACKGROUND

Legacy web applications are often poorly-understood by the application owners who have been tasked with their maintenance and care. This is particularly true when they are coupled with legacy identity and access management (IAM) systems responsible for propagating user information into the application. In some circumstances, the process to migrate the application's identity system to a new IAM system (e.g., an IAM system supporting standard identity protocol(s), multi-factor authentication, etc.) can be manual and labor-intensive.

The description provided in the background section should not be assumed to be prior art merely because it is mentioned in or associated with the background section. The background section may include information that describes one or more aspects of the subject technology.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

Broadly, aspects of the present disclosure are directed to a system (e.g., shown as system 100 in FIG. 1) that helps in discovering and analyzing the independent dependencies (e.g., custom hypertext transfer protocol (HTTP) headers and HTTP request cookies, to name two non-limiting examples) of a legacy application to facilitate identity migration and modernization, while minimizing or reducing updates to the application. In some aspects, discovering the HTTP request values that the legacy application currently expects may help enable modern authentication/authorization practices to be layered in. Furthermore, adding modern authentication and authorization may help enhance the security of legacy applications without forcing a complete application rewrite, as described in further detail below.

In some examples, the system of the present disclosure is configured to capture application related traffic. Some non-limiting examples of application related traffic may include application requests to an app and/or application responses from an app. In some cases, the system is configured to transform the captured application traffic (e.g., application request or response) into a format suitable for analysis and consumption by an end-user (e.g., a discovery module user associated with UE 405-a in FIG. 4A). The system may also analyze one or more authentication requirements and/or authorization requirements for accessing the application. Additionally, or alternatively, the system analyzes attribute-loading requirements (e.g., for user attributes, such as email address, phone number, residential address, job title, department, employee ID, etc.). In some instances, user attributes sent in non-standard HTTP headers can be used to identify a user to the application. These attributes may be stored in data stores such as lightweight directory access protocol (LDAP) and/or relational databases. In accordance with aspects of the disclosure, the discovery module can make inferences about the source data store based on the name and/or values of the user attributes. Additionally, as part of the attribute detection analysis process, the discovery module may determine which attributes (e.g., user attributes) a given application (or app) depends on. In some cases, the system validates access control behavior against compliance and regulatory standards. Further, the system provides an analysis of the output, for instance, in a visual form using a graphical user interface (GUI) on a user device. In other cases, the system provides an analysis of the output via an application programming interface (API).

One aspect of the present disclosure relates to a system configured for analyzing authentication and authorization requirements in an identity infrastructure. The system may include one or more hardware processors configured by machine-readable instructions. The processor(s) may be configured to intercept, at a server, a first request to access an application in the identity infrastructure, where the first request is received from a first user device; transmit, from the server, one or more of the first request and a modified version of the first request to access the application; intercept at the server, a response from the application, based at least in part on the transmission; display, via at least one interface, an analysis of one or more of the first request, the modified version of the first request, and the response, where the analysis may include determining at least one of requirements for application authentication and authorization, one or more identity protocols utilized by the application, one or more identity techniques utilized by the application, whether application meets predetermined compliance standards, and whether any user-defined security requirements have been implemented.

In some implementations of the system, the one or more hardware processors are further configured by machine-readable instructions to capture a second request to access the application, wherein the second request comprises the modified version of the first request and includes one or more identity dependencies received from an identity and access management system. In some implementations of the system, the transmission comprises transmitting the second request to the application.

One aspect of the present disclosure relates to a method for analyzing authentication and authorization requirements in an identity infrastructure, where the method includes intercepting, at a server, a first request to access an application in the identity infrastructure, where the first request is received from a first user device; transmitting, from the server, one or more of the first request and a modified version of the first request to access the application; intercepting, at the server, a response from the application, based at least in part on the transmission; displaying, via at least one interface, an analysis of one or more of the first request, the modified version of the first request, and the response, where the analysis may include determining at least one of requirements for application authentication and authorization, one or more identity protocols utilized by the application, one or more identity techniques utilized by the application, whether application meets predetermined compliance standards, and whether any user-defined security requirements have been implemented.

In some implementations of the method, the method further includes capturing a second request to access the application, wherein the second request comprises the modified version of the first request and includes one or more identity dependencies received from an identity and access management system. In some implementations of the method, the transmitting comprises transmitting the second request to the application. In some implementations of the method, intercepting the response comprises intercepting the response from one of the IAM system or the application.

In some implementations of the method, at least one of the identity dependencies and the requirements for authentication and authorization may include one or more differences between the second request and the first request. In some implementations of the method, the one or more differences between the second request and the first request include at least one of addition of the custom HTTP headers, addition of the custom cookies, and modification of one or more attributes in one or more of the first request and the second request.

In some implementations of the method, the HTTP headers may include status codes, redirect locations, query parameters, and one or more custom HTTP headers.

One aspect of the present disclosure relates to a non-transient computer-readable storage medium having instructions embodied thereon, the instructions being executable by one or more processors to perform a method for analyzing authentication and authorization requirements in an identity infrastructure, where the method includes intercepting, at a server, a first request to access an application in the identity infrastructure, where the first request is received from a first user device; transmitting, from the server, one or more of the first request and a modified version of the first request to access the application; intercepting, at the server, a response from the application, based at least in part on the transmission; displaying, via at least one interface, an analysis of one or more of the first request, the modified version of the first request, and the response, where the analysis may include determining at least one of requirements for application authentication and authorization, one or more identity protocols utilized by the application, one or more identity techniques utilized by the application, whether application meets predetermined compliance standards, and whether any user-defined security requirements have been implemented.

In some implementations of the system, method, and non-transient computer-readable storage medium described herein, the custom HTTP headers further comprise one or more application user attributes for one or more users, wherein the one or more application user attributes are selected from a group consisting of a first name, a last name, an email address, group membership information, a role, a title, and a username. In some implementations of the system, method, and non-transient computer-readable storage medium described herein, the custom HTTP cookies comprise at least one of a username and a group.

In some implementations of the system, method, and non-transient computer-readable storage medium described herein, the one or more identity protocols and identity techniques utilized by the application comprise one or more of Security Assertion Markup Language (SAML), OpenID Connect (OIDC), Kerberos, and header-based authentication. In some implementations of the system, method, and non-transient computer-readable storage medium described herein, the predetermined compliance standards comprise at least one of regulatory standards and customer-defined security requirements, the regulatory standards including at least one of Payment Card Industry (PCI) Data Security Standard, Health Insurance Portability and Accountability Act (HIPAA), System and Organization Controls (SOC2) compliance standard, and the use of Transport Layer Security (TLS). In some implementations of the system, method, and non-transient computer-readable storage medium described herein, the customer-defined security requirements comprise at least one of multi-factor authentication and a zero-trust security model.

In some implementations of the system, method, and non-transient computer-readable storage medium, the first request is further transformed from a first format to a second format, where the second format is different than the first format and comprises one or more of request headers, response headers, request bodies, response bodies, request methods, response methods, and cookies.

In some implementations of the system, method, and non-transient computer-readable storage medium, the server comprises a webserver, the webserver comprising at least one of an Apache server, an IBM HTTP server (IHS), an Oracle HTTP server (OHS), and a NGINX server.

In some implementations of the system, method, and non-transient computer-readable storage medium, the response comprises a response from the IAM system blocking the first request from reaching the application, and wherein the first request comprises an unmodified request received from the first user device.

In some implementations of the system, method, and non-transient computer-readable storage medium, determining the requirements for application authentication and application authorization comprises analyzing one or more of application authentication requirements and application authorization requirements in the identity infrastructure for migration from the IAM system to another IAM system. In some implementations of the system, method, and non-transient computer-readable storage medium, the another IAM system comprises one or more of an IAM system utilizing a standard identity protocol, the standard identity protocol comprising at least one of OpenID Connect (OIDC), Security Assertion Markup Language (SAML), and WebAuthn; an IAM system supporting multi-factor authentication; and an IAM system that is not supported by a third-party, wherein the third-party comprises a vendor.

In some implementations of the system, method, and non-transient computer-readable storage medium, the migration from the IAM system to the another IAM system comprises using a third-party system to pass, from the IAM system to the another IAM system, one or more of the identity dependencies; requirements for application authentication and authorization; one or more identity protocols utilized by the application; one or more identity techniques utilized by the application; predetermined compliance standards; and user-defined security requirements.

One aspect of the present disclosure relates to a system configured for analyzing authentication and authorization requirements in an identity infrastructure. The system may include one or more hardware processors configured by machine-readable instructions. The processor(s) may be configured to intercept a first request to access an application in the identity infrastructure. The processor(s) may be configured to capture a second request to access the application. The second request may include a modified version of the first request to include one or more identity dependencies received from an identity and access management system. The processor(s) may be configured to identify a transmission of the second request to the application. The processor(s) may be configured to intercept a response from the application, based at least in part on the transmission. The processor(s) may be configured to display, via at least one interface, an analysis of one or more of the first request, the second request, and the response. The analysis may include determining at least one of requirements for application authentication and authorization, one or more identity protocols utilized by the application, one or more identity techniques utilized by the application, whether application meets predetermined compliance standards, and whether any user-defined security requirements have been implemented.

In some implementations of the system, the identity dependencies may include identity attributes received from an external attribute source, request headers, response headers, request bodies, response bodies, request methods, response methods, and cookies. In some implementations of the system, the at least one interface may include one or more of a graphical user interface (GUI) and an application programming interface (API).

In some implementations of the system, the identity attribute(s) may comprise an email address, a phone number, a residential address, a job title, an employer department, and/or an employee identifier (ID) number. It should be noted that other types of identity attribute(s) are contemplated in different embodiments and the examples listed herein are not intended to be limiting. In some implementations of the system, the external attribute source may include one or more of a lightweight directory access protocol (LDAP) associated with the application, a database, and a web service.

In some implementations of the system, the request headers and/or response headers may include one or more of modifying and adding hypertext transfer protocol (HTTP) headers. In some implementations of the system, the cookies may include or more of modifying and adding HTTP cookies.

In some implementations of the system, the request bodies and response bodies may include one or more of modifying and adding HTTP request bodies. For instance, in some embodiments, one or more HTTP request bodies (or alternatively, HTTP request values) included in the request body of the application request may be modified. Additionally, or alternatively, one or more HTTP request values may be added to the request body of the application request. In other cases, one or more HTTP request bodies may be added to one or more of the request bodies and response bodies described herein.

In some implementations of the system, the request method(s) may include an HTTP request method. In some implementations of the system, the response method(s) may include an HTTP response method. In some implementations of the system, the request and response methods comprise an HTTP request method.

In some implementations of the system, the HTTP request method may include at least one of a GET method, a HEAD method, a POST method, a PUT method, a DELETE method, a CONNECT method, a TRACE method, and a PATCH method.

In some implementations of the system, the HTTP response method may include at least one of a GET method, a HEAD method, a POST method, a PUT method, a DELETE method, a CONNECT method, a TRACE method, and a PATCH method.

In some implementations of the system, the identity dependencies may include the requirements for authentication and authorization. In some implementations of the system, the HTTP headers may include custom HTTP headers (e.g., "X-Username: jdoe" or "X-Groups: ["admins", "executives"]"). In some implementations of the system, the HTTP cookies may include custom HTTP cookies (e.g., "Cookie: username=jdoe; groups=["admins", "executives"]").

In some implementations of the system, the requirements for authentication and authorization may include multi-factor authentication (or MFA) and rules governing access of application resources (i.e., resources associated with the application, such as, but not limited to, URL paths, files, documents, images, videos, strings, etc.). In some implementations of the system, the MFA may include one or more of user credentials (e.g., username, password), biometrics (e.g., fingerprint, iris scan, retina scan, voice recognition, facial recognition), and Single Sign-On (SSO) policies.

In some implementations of the system, the custom HTTP headers may include at least username and/or group information. The custom HTTP headers may further comprise one or more application user attributes for one or more users, where the one or more application user attributes are selected from a group consisting of a first name, a last name, an email address, group membership information, a role, a title, and a username. In some implementations of the system, the custom HTTP cookies may include one or more of a username, a unique identifier, an encrypted value, and a group.

In some implementations of the system, at least one of the identity dependencies and the requirements for authentication and authorization may include one or more differences between the second request (i.e., the modified version of the first request) and the first request. In some instances, the one or more differences between the second request and the first request may be based at least in part on addition of custom HTTP headers to the first request, addition of custom cookies to the first request, and modification of one or more attributes in one or more of the first request and the second request. For example, the first request may be modified by adding one or more custom HTTP headers, custom cookies, etc., to create the second request. In some instances, this modification of the first request may be performed by a legacy IAM module (e.g., IAM module 416-a in FIG. 4A) of a webserver (e.g., webserver 415-a in FIG. 4A).

In some implementations of the system, at least one of the identity dependencies and the requirements for authentication and authorization comprises one or more differences between the second request and the first request, wherein the one or more differences between the second request and the first request include at least one of addition of the custom HTTP headers, addition of the custom HTTP cookies, and modification of one or more attributes in one or more of the first request and the second request.

In some implementations of the system, the HTTP response headers may include status codes, redirect locations, and query parameters. In some embodiments, the HTTP response headers may be included in the application response received from the app. In some implementations of the system, the HTTP headers comprise one or more of status codes, redirect locations, query parameters, and one or more custom HTTP headers.

Another aspect of the present disclosure relates to a method for analyzing authentication and authorization requirements in an identity infrastructure. The method may include intercepting a first request to access an application in the identity infrastructure. The method may include capturing a second request to access the application. The second request may include a modified version of the first request to include one or more identity dependencies received from an identity and access management system. The method may include identifying a transmission of the second request to the application. The method may include intercepting a response from the application, based at least in part on the transmission. The method may include displaying, via at least one interface, an analysis of one or more of the first request, the second request, and the response. The analysis may include determining at least one of requirements for application authentication and authorization, one or more identity protocols utilized by the application, one or more identity techniques utilized by the application, whether application meets predetermined compliance standards, and whether any user-defined security requirements have been implemented.

In some implementations of the method, the identity dependencies may include identity attributes received from an external attribute source, request and response headers, request and response bodies, request and response methods, and cookies. In some implementations of the method, the at least one interface may include one or more of a graphical user interface and an application programming interface.

In some implementations of the method, the identity attributes may include one or more of an email address, a phone number, a residential address, a job title, an employer department, and an employee ID. In some implementations of the method, the external attribute source may include one or more of a LDAP associated with the application, a database, and a web service. In some implementations of the method, the request and response headers may include one or more of modifying and adding HTTP headers. In some implementations of the method, the cookies may include or more of modifying and adding HTTP cookies. In some implementations of the method, the request and response bodies may include one or more of modifying and adding HTTP request bodies (or alternatively, HTTP request values). In some implementations of the method, the request and response methods may include an HTTP request method (or simply, an HTTP method).

In some implementations of the method, the identity dependencies may include the requirements for authentication and authorization. In some implementations of the method, the HTTP headers may include custom HTTP headers. In some implementations of the method, the HTTP cookies may include custom HTTP cookies. In some implementations of the method, the HTTP request method (or HTTP method) may include at least one of a GET method, a HEAD method, a POST method, a PUT method, a DELETE method, a CONNECT method, a TRACE method, and a PATCH method.

In some implementations of the method, the requirements for authentication and authorization may include MFA and rules governing access of application resources. In some implementations of the method, the multi-factor authentication may include one or more of username, password, biometric, and SSO policies. In some implementations of the method, the custom HTTP headers may include at least one of a username and a group. In some implementations of the method, the custom HTTP cookies may include at least one of a username and a group.

In some implementations of the method, at least one of the identity dependencies and the requirements for authentication and authorization may include one or more differences between the second request and the first request.

In some implementations of the method, the HTTP response headers may include status codes, redirect locations, and query parameters.

Yet another aspect of the present disclosure relates to a non-transient computer-readable storage medium having instructions embodied thereon, the instructions being executable by one or more processors to perform a method for analyzing authentication and authorization requirements in an identity infrastructure. The method may include intercepting a first request to access an application in the identity infrastructure. The method may include capturing a second request to access the application. The second request may include a modified version of the first request to include one or more identity dependencies received from an identity and access management system. The method may include identifying a transmission of the second request to the application. The method may include intercepting a response from the application, based at least in part on the transmission. The method may include displaying, via at least one interface, an analysis of one or more of the first request, the second request, and the response. The analysis may include determining at least one of requirements for application authentication and authorization, one or more identity protocols utilized by the application, one or more identity techniques utilized by the application, whether application meets predetermined compliance standards, and whether any user-defined security requirements have been implemented.

In some implementations of the computer-readable storage medium, the identity dependencies may include identity attributes received from an external attribute source, request and response headers, request and response bodies, request and response methods, and cookies. In some implementations of the computer-readable storage medium, the at least one interface may include one or more of a graphical user interface and an application programming interface.

In some implementations of the computer-readable storage medium, the identity attributes may include one or more of an email address, a phone number, a residential address, a job title, an employer department, and an employee identifier or ID. In some implementations of the computer-readable storage medium, the external attribute source may include one or more of a LDAP associated with the application, a database, and a web service. In some implementations of the computer-readable storage medium, the request and response headers may include one or more of modifying and adding HTTP headers. In some implementations of the computer-readable storage medium, the cookies may include or more of modifying and adding HTTP cookies. In some implementations of the computer-readable storage medium, the request and response bodies may include one or more of modifying and adding HTTP request bodies (or alternatively, HTTP request values). In some implementations of the computer-readable storage medium, the request and response methods may include an HTTP request method.

In some implementations of the computer-readable storage medium, the identity dependencies may include the requirements for authentication and authorization. In some implementations of the computer-readable storage medium, the HTTP headers may include custom HTTP headers. In some implementations of the computer-readable storage medium, the HTTP cookies may include custom HTTP cookies. In some implementations of the computer-readable storage medium, the HTTP request method may include at least one of a GET method, a HEAD method, a POST method, a PUT method, a DELETE method, a CONNECT method, a TRACE method, and a PATCH method.

In some implementations of the computer-readable storage medium, the requirements for authentication and authorization may include multi-factor authentication and rules governing access of resources associated with the application. In some implementations of the computer-readable storage medium, the multi-factor authentication may include one or more of a username, a password, biometric information, and SSO policies. In some implementations of the computer-readable storage medium, the custom HTTP headers may include at least one of a username and a group. In some implementations of the computer-readable storage medium, the custom HTTP cookies may include at least one of a username and a group.

In some implementations of the computer-readable storage medium, at least one of the identity dependencies and the requirements for authentication and authorization may include one or more differences between the second request and the first request.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

FIG. 5 illustrates another swim diagram representation of a method for analyzing authentication and authorization requirements in an identity infrastructure, in accordance with various aspects of the disclosure.

DETAILED DESCRIPTION

Figure 1:
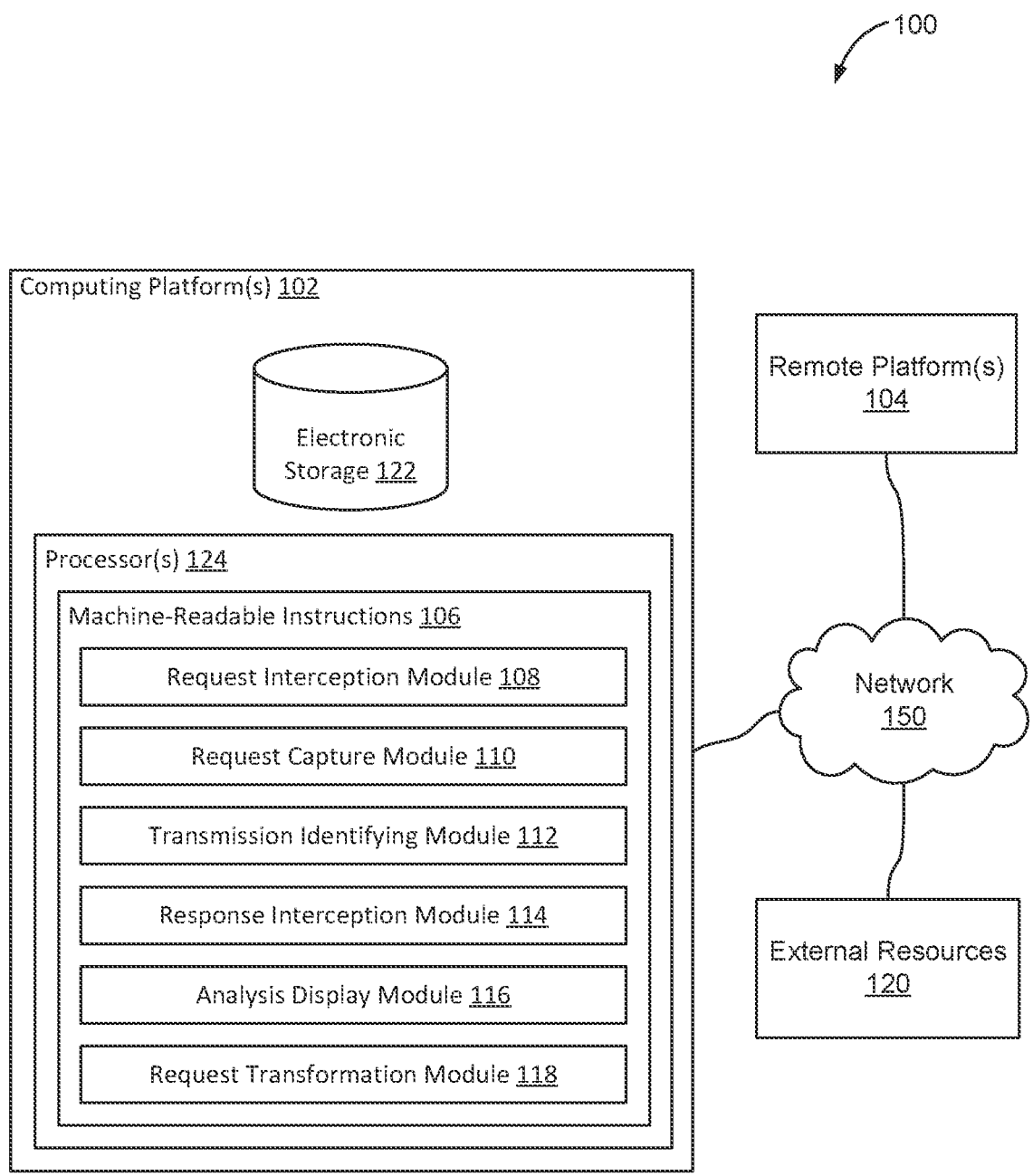
FIG. 1 illustrates a system configured for analyzing authentication and authorization requirements in an identity infrastructure, in accordance with various aspects of the disclosure.

In the following detailed description, references are made to the accompanying drawings that form a part hereof, and in which are shown by way of illustrations or specific examples. These aspects may be combined, other aspects may be utilized, and structural changes may be made without departing from the present disclosure. Example aspects may be practiced as methods, systems, or devices. Accordingly, example aspects may take the form of a hardware implementation, a software implementation, or an implementation combining software and hardware aspects. The following detailed description is therefore not to be taken in a limiting sense, and the scope of the present disclosure is defined by the appended claims and their equivalents.

The words "for example" is used herein to mean "serving as an example, instant, or illustration." Any embodiment described herein as "for example" or any related term is not necessarily to be construed as preferred or advantageous over other embodiments. Additionally, a reference to a "device" is not meant to be limiting to a single such device. It is contemplated that numerous devices may comprise a single "device" as described herein.

The embodiments described below are not intended to limit the disclosure to the precise form disclosed, nor are they intended to be exhaustive. Rather, the embodiment is presented to provide a description so that others skilled in the art may utilize its teachings. Technology continues to develop, and elements of the described and disclosed embodiments may be replaced by improved and enhanced items, however the teaching of the present disclosure inherently discloses elements used in embodiments incorporating technology available at the time of this disclosure.

The detailed descriptions which follow are presented in part in terms of algorithms and symbolic representations of operations on data within a computer memory where such data often represents numerical quantities, alphanumeric characters or character strings, logical states, data structures, or the like. A computer generally includes one or more processing mechanisms for executing instructions, and memory for storing instructions and data.

When a general-purpose computer has a series of machine-specific encoded instructions stored in its memory, the computer executing such encoded instructions may become a specific type of machine, namely a computer particularly configured to perform the operations embodied by the series of instructions. Some of the instructions may be adapted to produce signals that control operation of other machines and thus may operate through those control signals to transform materials or influence operations far removed from the computer itself. These descriptions and representations are the means used by those skilled in the data processing arts to convey the substance of their work most effectively to others skilled in the art.

The term algorithm as used herein, and generally in the art, refers to a self-consistent sequence of ordered steps that culminate in a desired result. These steps are those requiring manipulations of physical quantities. Usually, though not necessarily, these quantities take the form of electrical or magnetic pulses or signals capable of being stored, transferred, transformed, combined, compared, and otherwise manipulated. It is often convenient for reasons of abstraction or common usage to refer to these signals as bits, values, symbols, characters, display data, terms, numbers, or the like, as signifiers of the physical items or manifestations of such signals. It should be borne in mind, however, that all of these and similar terms are to be associated with the appropriate physical quantities and are merely used here as convenient labels applied to these quantities.

Some algorithms may use data structures for both inputting information and producing the desired result. Data structures facilitate data management by data processing systems and are not accessible except through sophisticated software systems. Data structures are not the information content of a memory, rather they represent specific electronic structural elements which impart or manifest a physical organization on the information stored in memory. More than mere abstraction, the data structures are specific electrical or magnetic structural elements in memory which simultaneously represent complex data accurately, often data modeling physical characteristics of related items, and provide increased efficiency in computer operation. By changing the organization and operation of data structures and the algorithms for manipulating data in such structures, the fundamental operation of the computing system may be changed and improved.

In the descriptions herein, operations and manipulations are often described in terms, such as comparing, sorting, selecting, or adding, which are commonly associated with mental operations performed by a human operator. It should be understood that these terms are employed to provide a clear description of an embodiment of the present invention, and no such human operator is necessary, nor desirable.

This requirement for machine implementation for the practical application of the algorithms is understood by those persons of skill in this art as not a duplication of human thought, rather as significantly more than such human capability. Useful machines for performing the operations of one or more embodiments of the present disclosure include general-purpose digital computers or other similar devices. In all cases, the distinction between the method operations in operating a computer and the method of computation itself should be recognized. One or more embodiments of the present disclosure relate to methods and apparatus for operating a computer in processing electrical or other (e.g., mechanical, chemical) physical signals to generate other desired physical manifestations or signals. The computer operates on software modules, which are collections of signals stored on a media that represents a series of machine instructions that enable the computer processor to perform the machine instructions that implement the algorithmic steps. Such machine instructions may be the actual computer code the processor interprets to implement the instructions, or alternatively may be a higher-level coding of the instructions that is interpreted to obtain the actual computer code. The software module may also include a hardware component, where some aspects of the algorithm may be performed by the circuitry itself rather than a result of an instruction.

Some embodiments of the present disclosure rely on an apparatus for performing one or more of the disclosed operations. This apparatus may be specifically constructed for the required purposes, or it may comprise a general purpose or configurable device, such as a computer selectively activated or reconfigured by a program comprising instructions stored to be accessible by the computer. The algorithms presented herein are not inherently related to any particular computer or other apparatus unless explicitly indicated as requiring particular hardware. In some cases, the computer programs may communicate or interact with other programs or equipment through signals configured to particular protocols which may or may not require specific hardware or programming to accomplish. In particular, various general-purpose machines may be used with programs written in accordance with the teachings herein, or it may prove more convenient to construct more specialized apparatus to perform the required method steps. The required structure for a variety of these machines will be apparent from the description below.

In the following description, several terms which are used frequently have specialized meanings in the present context.

In the description of embodiments herein, frequent use is made of the terms server, client, and client/server architecture. In this context, a server and client are each instantiations of a set of functions and capabilities intended to support distributed computing. These terms are often used to refer to a computer or computing machinery, yet it should be appreciated that the server or client function is provided by machine execution of program instructions, threads, modules, processes, or applications. The client computer and server computer are often, but not necessarily, geographically separated, although the salient aspect is that the client and server each perform distinct, but complementary functions to accomplish a task or provide a service. The client and server accomplish this by exchanging data (e.g., in data flows), messages, and state information using a computer network, or multiple networks. It should be appreciated that in a client/server architecture for distributed computing, there are typically multiple servers and multiple clients, and they do not map to each other and further there may be more servers than clients or more clients than servers. A server is typically designed to interact with multiple clients. In some embodiments, a client computer (or simply, client) may be implemented using a user device or user equipment (UE), one non-limiting example of which includes UE 405-*a* in FIG. 4A. Some non-limiting examples of UEs (or clients)

may include one or more of a laptop, a desktop computer, a tablet computer, and/or a NetBook. Furthermore, the UEs discussed herein may utilize any type of operating system (OS) and/or may support different types of communication technologies (e.g., wired or wireless communication technologies).

In networks, bi-directional data communication (i.e., data flows or traffic) may occur through the transmission of encoded light, electrical, or radio signals over wire, fiber, analog, digital cellular, Wi-Fi, or personal communications service (PCS) media, or through multiple networks and media connected by gateways or routing devices. Signals may be transmitted through a physical medium such as wire or fiber, or via wireless technology using encoded radio waves. Much wireless data communication takes place across cellular systems using second generation technology such as code-division multiple access (CDMA), time division multiple access (TDMA), the Global System for Mobile Communications (GSM), Third Generation (wideband or 3G), Fourth Generation (broadband or 4G), Fifth Generation (5G), personal digital cellular (PDC), or through packet-data technology over analog systems such as cellular digital packet data (CDPD).

Definitions and Terminology Used in the Disclosure

For the purposes of this disclosure, identity data may refer to individual users' data, including their credentials and attributes. For instance, identity data may include one or more of a user identity (e.g., first and/or last name of a user), a user credential (e.g., username, password, password authentication token, etc., that are bound to the user), and a user attribute (e.g., email address, phone number, residential address, job title, department, employee ID, etc.) for each of one or more individual users of one or more identity domains or identity providers (e.g., identity provider associated with IAM module 416-a in FIG. 4A). As used herein, the terms "identity domain", "identity system", "IAM system", or "identity provider" may be used interchangeably throughout the disclosure. Additionally, the terms "discovery module", "discovery agent", or "discovery element" may also be used interchangeably throughout the disclosure.

An identity session (also referred to herein as a "session") may refer to an established set of identity data (e.g., identity data accepted by the identity infrastructure to access a resource, such as an application) that represents a user interacting with the identity infrastructure. In some cases, an identity session (e.g., session 634 in FIG. 6) may be established by authenticating a user (e.g., by a user proving their identity through a mechanism such as username and password and/or biometrics, such as fingerprint, iris scan, voice recognition, etc.) and maintaining this session state (e.g., authenticated state) for some established period of time or until the user logs out or their access rights are otherwise suspended. In some cases, an identity session may refer to a logical construct, for instance, based on a user's identity, that establishes persistence across resource access (e.g., file access, app access) and/or page views (e.g., hypertext transfer protocol (HTTP) pages). It is contemplated that a "resource" may also refer to "page views". For example, HTTP is a stateless protocol, which means that when a user requests a particular webpage or resource from a server, and subsequently requests another webpage or resource from the same server, the server treats the user as a new "requestor" each time. In some examples, a session state refers to a feature that allows an identity domain to remember the user by keeping a temporary record of identity data associated with the user. In some cases, each identity session may be assigned a unique identifier (or session ID) and this session ID may be used to store and retrieve a session state (or an application's working set of data) before and after each page view (e.g., HTTP page view). The application's working set of data may refer to information associated with one or more page views (e.g., items in a shopping cart for an online shopping or e-commerce website). In some cases, the information associated with the session, such as the session ID, may be stored on the server from which the user is requesting the webpage or resource. Additionally, or alternatively, the session ID may be stored on a different computing device such as a user device (e.g., laptop, smartphone, etc.) from which the user is accessing the resource. In some cases, an identity session may be established by authenticating a user and maintaining a session state for at least a threshold or an established period of time (e.g., 1 minute, 30 seconds, 5 minutes, etc.). In some cases, an identity session may also constitute a set of permissions granted to the user (e.g., for accessing resources, such as protected resources accessible to only certain users, in the identity infrastructure) and/or role information associated with the user. In some embodiments, the role information may be different from the user attribute. For instance, multiple users may be associated with the same or similar role information but may have different user attributes. In one example, users having similar designations or seniority levels in an organization (e.g., managers, managing directors, staff engineers, etc.) may be associated with the same or similar role information.

Identity metadata may be used herein to refer to information pertaining to how identity is managed and coordinated. Identity metadata may include password rules, such as, but not limited to password length or a requirement that the password must contain one capital letter, one number, one symbol and/or cannot be the same as a previous password. Identity metadata may also include authorization policies, such as, but not limited to a policy which states that user must be in the administrator group to access a resource, a user must be logged in from a US-based IP address, and/or a user may only access resources during business hours (e.g., 9 AM to 5 PM). Additionally, or alternatively, identity metadata may also include a trust policy and network locations for identity domain elements of one or more identity domains (i.e., identity providers). The identity metadata may further include one or more of: the enumeration of identity infrastructure elements and their network location and configuration, identity policies such as authorization or authentication rules and mechanisms, and identity session structure and content.

In some examples, identity sessions may comprise timestamps for when a session was initiated, the maximum lifetime of a session, how long a session should last for an idle user, an opaque user identifier (e.g., a type of user identifier that does not reveal the user's identity and may comprise a random string or number), a reference to a session identifier (potentially optional, e.g., if maintained centrally), a reference to a requested resource, one or more claims about the user (which may comprise identity attributes), one or more "scopes", and/or an enumeration of privileges the user has for the requested resource. In some examples, sessions may be maintained in browser cookies, JavaScript Object Notation (JSON) objects that are passed between different endpoints, server caches, or databases. In some cases, scopes may be used to define the specific actions that are permitted to be performed on behalf of a user, an application, etc. When a user agent (e.g., web browser)

requests permission to access a protected resource or application through an authorization server, a scope parameter may be provided to specify what access is needed and the authorization server may use the scope parameter to respond with the access that is actually granted (e.g., the granted access may be different from what was requested). In some examples, this process may comprise the authorization server (e.g., access system 623) generating an access token comprising one or more scopes based on evaluating the user authentication data and/or scope parameters. In some cases, the access token comprises a string of random characters that enables the protected resource (e.g., app 620) to verify whether incoming requests should be granted access to the protected app. For instance, the access token may be based in part on the username/password credentials received from the user during login (e.g., login 601). In some cases, the access token serves as a key comprising a collection of metadata (e.g., information pertaining to an authorization policy for the user).

An identity domain (e.g., depicted by IAM module 416-*a*) refers to a computing system for managing one or more of users and roles, integration standards, external identities (e.g., identities not associated with the identity domain), and secure application integration using, for instance, an authentication scheme (e.g., Single Sign-On (SSO)) and/or an authorization protocol (e.g., a set of rules that allows a third-party website or application to access a user's data without the user needing to share login credentials).

Application integration, as used herein, refers to a mechanism for supporting interactions between a protected app/resource associated with a first identity domain and users associated with a second different identity domain. As an example, an enterprise may have developed an app for its customer or enterprise partner, where the app may be secured by a first identity domain. Further, the enterprise partner may already manage one or more identities on other identity domains, such as a second identity domain. In such cases, the enterprise may integrate their app with the second identity domain, which may allow users associated with the second identity domain to seamlessly interact with their app without creating another identity (e.g., in the first identity domain) to access the app. In another case, an enterprise may migrate users from a legacy identity domain to a new identity domain, while still keeping the legacy identity domain for controlling access to an application. In such cases, users attempting to access the application may login with the new identity domain, following which an intermediary/proxy updates a datastore, where the datastore is utilized by the app to grant or deny access to its resources.

In some cases, integration of identities and applications may be performed using one of numerous methods, such as manual identity administration (e.g., manually adding users from the second identity domain into the first identity domain), utilizing existing identity solutions (e.g., allowing users to sign in using their GOOGLE or MICROSOFT credentials, provided by Alphabet, Inc., of Mountain View, CA, and Microsoft Corp., of Redmond, WA, respectively), and/or federation (e.g., enterprise and customer mutually agree to allow the customer users to use their own identities to access the app provided by the enterprise). In some cases, identity federation may comprise enforcing common identity standards and protocols to coordinate and manage user identities between different identity providers or identity domains, applications, etc., across an identity infrastructure.

There exist numerous identity and access management (IAM) standards (also referred to as integration standards) for managing access. In some cases, these IAM standards are "open" standards, that is, they are publicly available and associated with one or more rights to use. In some cases, these IAM standards are integrated (e.g., unified) and used across a plurality of applications, devices, and/or users. Some non-limiting examples of IAM standards include Security Assertion Markup Language (SAML) used to send authorization messages between trusted partners or entities, OpenID Connect (OIDC), Web Services Trust (WS-Trust), WS-Federation, and OAuth. SAML defines an XML framework for exchanging security assertions among security authorities and facilitates interoperability across different vendor platforms that provide authentication and/or authorization services. In some circumstances, OAuth may enable a user's account information to be used by third-party services, such as FACEBOOK provided by Facebook, Inc., of Menlo Park, CA, without exposing the user's password. In some examples, an identity domain (or identity provider) controls the authentication and authorization of the users who can sign into a service (e.g., a cloud service), and what features they can access in relation to the service. For example, a cloud service (e.g., Database Cloud Service and Infrastructure as a Service (IaaS)) may be associated with an identity domain. Multiple services may be associated with a single identity domain or provider to share user definitions and authentication rules, for instance. In some cases, users associated with an identity domain may be granted different levels of access (or authorization) to each service (e.g., cloud service) associated with the identity domain. For instance, a first user (e.g., a system administrator) may be provided both read and write access, while another user (e.g., accountant) may only be provided read access. Thus, in some aspects, an identity domain or provider is a self-contained realm with consistent identity data and identity metadata throughout. Some non-limiting examples of an identity domain include an Active Directory (AD) domain or an OKTA account for a single company. It should be noted that other identity domains known in the art may be contemplated in different embodiments.

A trust relationship refers to a logical link established between two entities (e.g., a user and an identity domain, two identity domains, etc.), where one of the entities may be referred to as a trusting domain (e.g., a first identity domain) while the other may be referred to as a trusted domain (e.g., a second identity domain). When a trust relationship is in place, the trusting domain may honor, for instance, a login authentication associated with the trusted domain. In some circumstances, trust relationships may be necessary for identity sessions to be accepted by the protected resource (e.g., application). Trust relationships may be a way to establish the validity of identity sessions and prevent spoofing of an identity session. In some cases, trust relationships may be established via a signature generated from a private key and validated using an associated public key.

Public key cryptography (also known as asymmetric cryptography) refers to an encryption technique where two parties (e.g., a user and an identity domain/provider, a user and a protected resource) may each be assigned two keys—a public key and a private key. Numerous cryptographic tools and modules exist for generating public/private key pairs. One non-limiting example of such a tool is OpenSSL provided by TheOpenSSL Project. OpenSSL is an open-source command line tool that is used for Transport Layer Security (TLS) and Secure Socket Layer (SSL) protocols and may be used to generate public/private keys, install SSL/TLS certificates, and identity certificate information. Other types of commercial and/or open-source tools for generating public and private keys are contemplated in different embodiments. In some cases, the two keys for a respective party may be connected and may comprise two large prime numbers (e.g., 100 digits long, 150 digits long, etc.) with certain mathematical properties. For instance, two random n-bit (e.g., 512-bit, 1024-bit, etc.) prime numbers may be generated and multiplied together to create a modulus (N), where the value N is part of the public and private key. The public key may be shareable and may allow a receiving entity to receive messages from other entities. Further, the receiving entity may decrypt the message or dataflow using their private key. In such cases, a receiving entity may decode a message or dataflow encoded by a transmitting entity (i.e., using the receiving entity's public key) by using their private key (i.e., the receiving entity's private key). In some cases, a user may be authenticated using their login credentials and a trusted third party (e.g., a Certification Authority (CA)) may prove a link between the user's public key and the user's identity. For instance, the CA may be associated with a public key and a private key and may sign a certificate using their private key. The identity domain or protected resource may use the CA's public key to determine the user's public key (e.g., embedded within the certificate) and verify the user (i.e., confirm the user's identity by verifying who they say they are). In some cases, any entity (e.g., protected resource, another user, etc.) with the CA's public key may decrypt the certificate to identify the user's public key.

In some cases, public/private key pairs may also be used to decrypt and verify assertions between different identity domain and/or identity infrastructure elements. Each receiving entity possessing a transmitting entity's public key may be able to read (e.g., decrypt) a message that has been signed using a corresponding private key of the transmitting entity and confirm that the original contents of the message have not been altered, for instance. Or, in one non-limiting example, an identity domain element may use its private key to sign a cookie associated with an identity session. In such cases, one or more protected resources or applications that trust and rely on the cookie to grant user access to the protected resource may utilize the public key in the identity session to decrypt and verify the signature, thereby enabling access to the protected resource.

In other cases, trust relationships may involve Transport Layer Security (TLS) combined with a Domain Name System (DNS) to confirm that traffic is routed to the expected element and not subject to interception by a rogue party (e.g., Man-in-the-middle attack). As an example, two servers may connect together over a network and communicate with each other, where their communications may be secured using TLS. In some cases, TLS may involve the use of a specific protocol to enable the servers to establish their identity with each other. Similarly, communication(s) between an identity domain/provider, protected resource, etc., may be secured using TLS. In some cases, a DNS routing a request to a host (e.g., a first server) may issue a certificate to the requesting party (e.g., a second server, a user agent, etc.) to prove that the DNS routed the request to the correct host. In some cases, the certificate may be signed using a private key associated with the DNS and may comprise a public key associated with the host server. The requesting party may decrypt the certificate (e.g., using the public key associated with the DNS) and retrieve the public key of the host embedded within the certificate, which may allow the requesting party to confirm that the request was routed to the expected element. In other cases, the host server may issue a certificate and sign it using their private key. The DNS or the host may further relay the certificate to the requesting party. After decryption, the requesting party may confirm the identity of the host that received their request.

In some examples, a discovery module (e.g., discovery module 417-a, discovery module 517, discovery module 617) may be employed to analyze authentication and authorization requirements in an identity infrastructure. The discovery module may be installed at a webserver to capture app requests (i.e., requests to access a protected app or resource) and app responses (i.e., responses transmitted by the app indicating whether a user is granted or denied access to the app) and present an analysis of the same to a discovery module user. In this way, the discovery module may facilitate migration to a new identity domain, for instance, enable the app or protected resource to be utilized with a new identity domain.

Lastly, a protected resource may refer to an element or application of the identity infrastructure that assesses or evaluates the identity data (e.g., information provided by a user to access the protected resource such as, but not limited to, a username, password, user attribute, unique identifier, unique pin, and biometric information such as, but not limited to a fingerprint, iris scan, and voice input, and other information known in the art) in order to make access and control decisions about its resources and/or data. One non-limiting example of a protected resource may include the app 420 (e.g., app 420-a and/or app 420-b). In other words, a protected resource may be aware about the identity data needed to access it. In some circumstances, the protected resource may use the identity session and/or the identity data in deciding to allow access to its data. In some embodiments, the protected resource may only allow restricted or partial access based on evaluating the identity data. As an example, a protected resource may expect a header or a cookie for access to the protected resource, while another protected resource may merely grant access upon a user arriving at that protected resource. Thus, each protected resource may be aware of the mechanism by which it may be provided an identity session by its associated identity domain. In some aspects, the protected resource(s) are coupled to the identity domain based on their reliance on identity session(s) and their particular formats and security constraints (i.e., identity data and/or identity metadata formats and constraints).

In some cases, a header/cookie may be passed in a token, such as an authentication token or an access token. In some cases, the authentication token may be generated and assigned to a user once the user is authenticated. Further, a certificate (e.g., a Public Key Infrastructure (PKI) certificate, such as a Secure Socket Layer (SSL) certificate) linked to the authentication token and representing a valid identity session may be issued to the user. In some cases, the certificate may be issued by a third party, such as a Certification Authority (CA), and may include the user's public key, a name, and any other applicable information. The certificate may serve as an attestation by the CA that the user is who they claim to be. For instance, the CA may sign a data structure that contains the user's public key and name, thus binding the user's public key to their name. Further, the certificate may be encrypted by the CA. The CA may also be linked to a private key and a public key, and may encrypt the certificate with a combination of the public and private keys associated with the CA. Any entity (e.g., protected resource or app, another user, another identity domain, etc.) with access to the CA's public key may verify the certificate (i.e., that the certificate is issued by a trusted CA) and/or the claim made in the certificate (i.e., the user is associated with the user's public key). The user may utilize this certificate for interactions with the protected resource, for instance.

In some cases, authorization may comprise using attribute information associated with the token issued to the user during authentication and comparing said information to access control rules for the protected resource (e.g., app, such as app 620). If the rule permits the user to access the protected resource, the authorization is successful, and the user is granted access to the protected resource. In some other cases, access tokens may be utilized, for instance, if an identity domain/provider or protected resource does not support the use of certificates and authentication tokens. In such cases, an access token may be issued by a server, such as an authorization server (e.g., access system 623) once the user identity data, access control rules, etc., is verified. In other words, the access token may serve as a proof that the user is authorized for access. This access token may be sent in an authorization header, such as an HTTP authorization header, and may be used to establish user identity and authorization. In some cases, the protected resource (e.g., app 620) or identity domain/provider may validate the token, for instance, via a call to one or more of the authentication server (e.g., authenticate system 621) and authorization server (e.g., access system 623), or using a public key corresponding to a private key with which the authentication and/or authorization server signed the access token. Alternatively, in some circumstances, anyone (e.g., authorized user, rogue user) holding the access token may gain access to the protected resource. To alleviate such issues, communication of the access token may be secured via TLS. Centralized validation of access tokens may also mitigate the chances of a rogue user gaining access to a protected resource (i.e., man-in-the-middle attack). Some non-limiting examples of tokens (e.g., access tokens, authentication tokens) may comprise bearer tokens, hash-based authentication code (HMAC) tokens, and RSA-SHA1 tokens using RSA private/public keypairs. In some cases, a token may comprise one or more of unique string values, hashed values, a cryptographic hash function and a secret cryptographic key, attributes information, etc., issued by a server, such as an authentication server (e.g., authenticate system 621).

The identity infrastructure may include one or more identity domains (or identity providers) and one or more identity infrastructure elements. The one or more identity domains (e.g., identity domain associated with IAM module 416-a) may further comprise one or more identity domain elements, where the one or more identity domain elements may comprise hardware (e.g., servers, computing devices or platforms, etc.), software (e.g., a cloud service), or a combination thereof. For example, in FIG. 6, the identity infrastructure 600 is associated with an identity domain and comprises an attributes system 626, an access system 623, an authenticate system 621, and app(s) 620. In some cases, the attributes system 626, the access system 623, and/or the authenticate system 621 may be embodied in hardware, software, or a combination thereof. By way of non-limiting example, the one or more identity infrastructure elements installed in the identity infrastructure may include one or more of servers, routers, datastores, identity stores comprising one or more databases of authentication information, policy enforcement points for enforcing authorization rules (e.g., shown as access system 623 in FIG. 6), authentication points for determining user identity (e.g., shown as authenticate system 621 in FIG. 6), proxy devices (optional), policy decision points for evaluating authorization rules based at least in part on identity session attributes, and protected resources (e.g., applications or apps, such as app(s) 620).

In some examples, a policy decision point (PDP) is a system entity or component of a policy-based access control system that may make authorization decisions for itself or alternatively, for other system entities that request such decisions. For instance, a PDP may determine whether or not to authorize a user's request based on available information (e.g., attributes, such as identity session attributes) and/or applicable security policies. In some cases, a PDP may examine a request to access a resource (e.g., an application or app, such as a mobile app, web-based app, etc.) and compare said request to the policy that applies to requests for accessing that resource (i.e., to determine whether the requestor, such as a user, should be granted access). Additionally, or alternatively, the identity infrastructure may comprise at least one authorizing agent, also referred to as an enforcing agent, for interpreting identity session information and evaluating access rules. In other words, the authorizing or enforcing agent may enforce access control for protected resources, such as app(s) 625, in the identity infrastructure. In some embodiments, the identity session and identity data may be associated with the identity session information. Further, the authorizing or enforcing agents may be realized using hardware, firmware, software or a combination thereof.

In some cases, an identity provider (or identity domain) may refer to a construct for managing one or more users and roles, integration standards, external identities, and secure application integration through single sign-on (SSO) configuration. In some aspects, an identity domain/provider may control the authentication and authorization of users who can sign into a service, and the features they can access in relation to the service. In some examples, the service may be a cloud service. In other cases, the service may be an on-premises service. In some circumstances, the identity infrastructure for an enterprise may comprise multiple identity domains/providers, and each identity domain may comprise multiple services. In other words, users of different identity domains/providers may be granted access to different services, applications, resources, etc., based on the services associated with each identity provider. Furthermore, users in an identity provider may also be granted different levels of access to each service associated with the identity provider. As used herein, the terms "identity domains", "identity providers", and "IAM systems" may be used interchangeably throughout the disclosure.

In some cases, an enterprise or organization may utilize one or more identity providers, such as an on-premises identity provider and one or more cloud-based identity providers. In such cases, the enterprise may also need to manage identity (e.g., of their employees, their customers, etc.) in multiple locations (e.g., geographic locations, network locations, or a combination). Businesses are increasingly using multiple cloud services (e.g., Amazon Web Services (AWS) provided by Amazon, Inc., of Seattle, WA, Azure AD provided by Microsoft, Corp., of Redmond, WA, Google Cloud Platform (GCP) provided by Alphabet, Inc., of Mountain View, CA), each of which use unique, built-in identity systems. Further, a business or enterprise may wish to migrate applications and/or identity information to the cloud with minimal changes to the apps, how users interact with the apps, etc. For instance, an enterprise using a legacy IAM system (e.g., not cloud based) may wish to migrate user accounts from the legacy IAM system to the cloud-based IAM system. However, the legacy IAM system may currently be used to secure access to an application (e.g., an on-premises hosted application). According to aspects of this disclosure, an enterprise may migrate their user identities (or identity information) from the legacy IAM system to a new IAM system (e.g., cloud-based identity system), such that user access to the application is now provided by the new IAM system, while at the same time minimizing user disruption and/or changes to user experience (i.e., how users interact with the application). In some aspects, the present disclosure also helps minimize the cost, time, and/or resources associated with rewriting the application to ensure compatibility with the new IAM system. As described in further detail below, the discovery module can be used to analyze the identity dependencies, authentication and authorization requirements, etc., in the identity infrastructure to determine the type of information required by the app to grant access to its resource, which may help optimize the migration process.

Turning now to FIG. 1, which illustrates a system 100 configured for analyzing authentication and authorization requirements in an identity infrastructure, according to various aspects of the disclosure. In some implementations, system 100 may include one or more computing platforms 102. Computing platform(s) 102 may be configured to communicate via network 150 with one or more remote platforms 104 according to a client/server architecture, a peer-to-peer architecture, and/or other architectures. Remote platform(s) 104 may be configured to communicate with other remote platforms via computing platform(s) 102 and/or according to a client/server architecture, a peer-to-peer architecture, and/or other architectures. Users may access system 100 via remote platform(s) 104. In some examples, a remote platform 104 may be referred to as a client computing platform, a user equipment (UE), a user device, or a computing device, and these terms may be used interchangeably throughout the disclosure. Alternatively, the remote platform 104 may comprise a server (e.g., a webserver hosting a third-party application). In one non-limiting example, the computing platform 102 may be similar or substantially similar to the webserver 415 (e.g., webserver 415-a in FIG. 4A).

Computing platform(s) 102 may be configured by machine-readable instructions 106. Machine-readable instructions 106 may include one or more instruction modules. The instruction modules may include computer program modules. The instruction modules may include one or more of request interception module 108, request capture module 110, transmission identifying module 112, response interception module 114, analysis display module 116, request transformation module 118, and/or other instruction modules.

Request interception module 108 may be configured to intercept a first request to access an application in the identity infrastructure. The first request may include a first request to a webserver. In some examples, the webserver may include at least one of an APACHE server, an INTERNATIONAL BUSINESS MACHINES (IBM) HTTP server, an ORACLE HTTP server, and a NGINX server. It should be noted that the examples of webserver(s) listed above are not intended to be limiting, and the system 100 of the present disclosure may be configured to intercept requests to other types of webservers known and/or contemplated in the art.

Figure 4A:
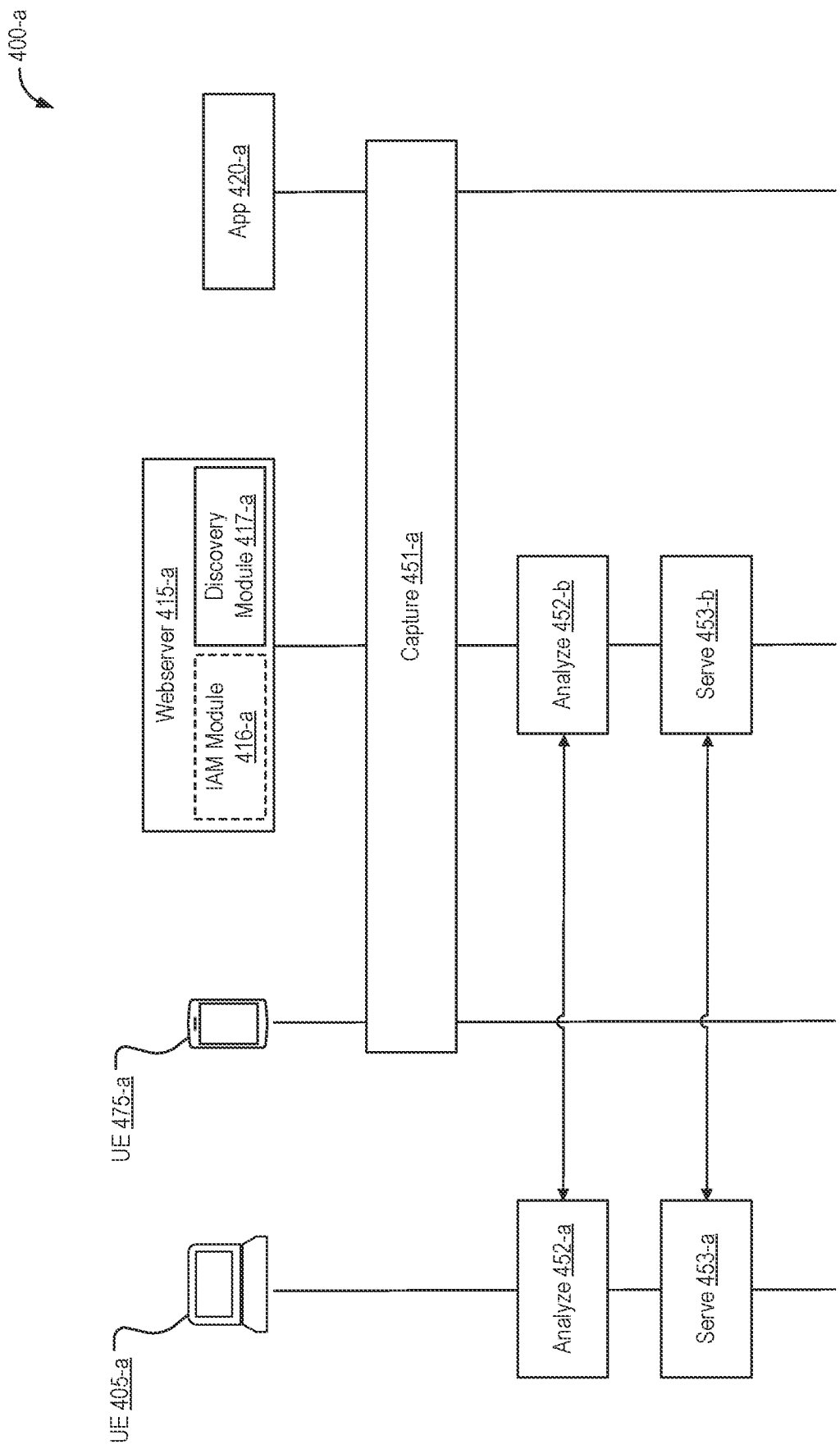
FIG. 4A illustrates a swim diagram representation of a method for analyzing authentication and authorization requirements in an identity infrastructure, in accordance with various aspects of the disclosure.
Figure 4B:
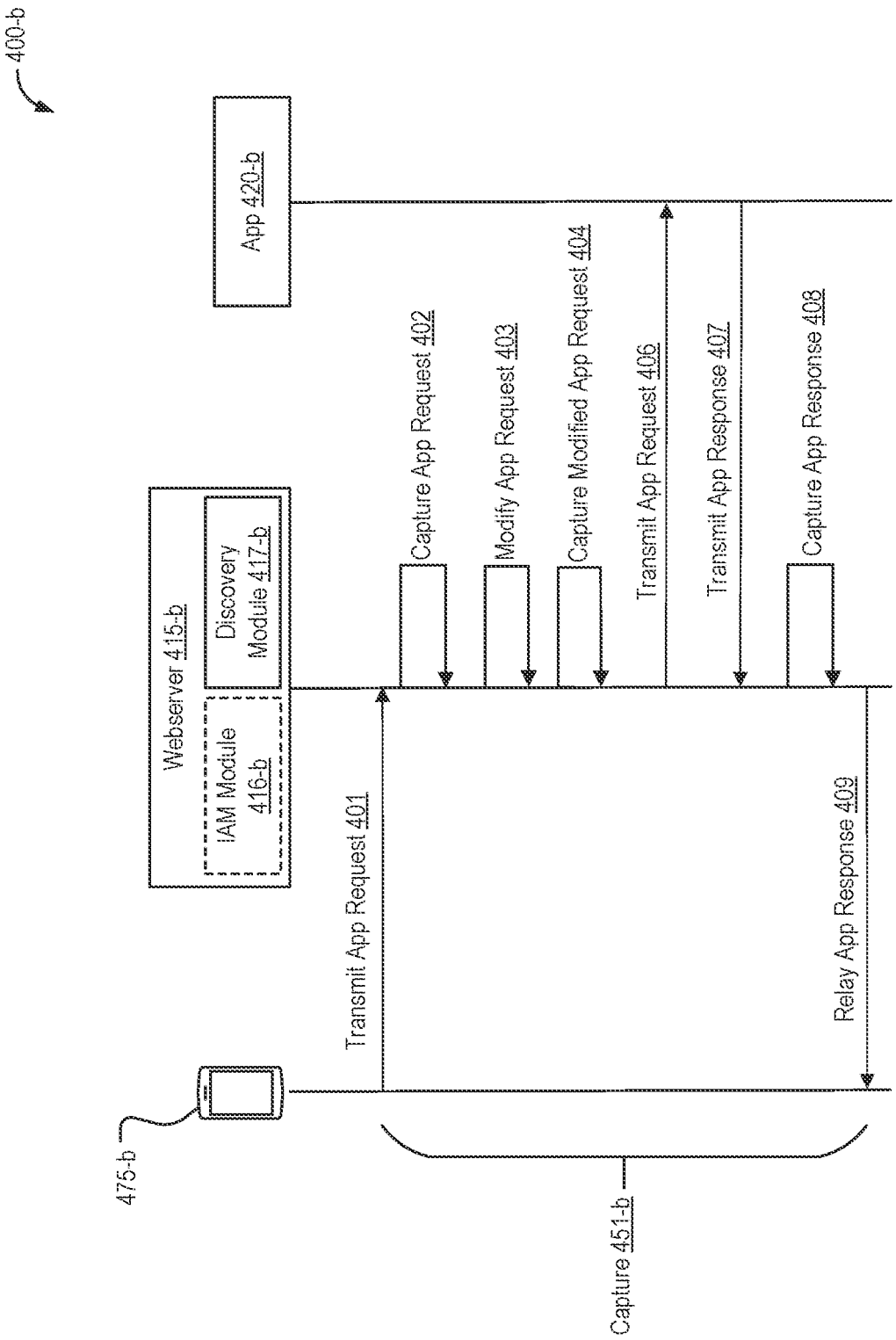
FIG. 4B illustrates a detailed swim diagram representation of the capture process in FIG. 4A, in accordance with various aspects of the disclosure.

For instance, FIG. 4B shows a UE 475-b transmitting an app request (operation 401) to access an app 420-b. In this case, the first request (or app request) to access the app 420-b is intercepted at, and captured by, the webserver 415-b.

Request capture module 110 may be configured to capture a second request to access the application. The second request may include a second request to the webserver. The second request may include a modified version of the first request, where the first request is modified to include one or more identity dependencies received from an identity and access management system (IAM system). For instance, as shown in FIG. 4B, the webserver 415-b comprises an optional IAM module 416-b and a discovery module 417-b, where each of the IAM module 416-b and the discovery module 417-b are embodied in hardware, software, or a combination thereof. Furthermore, the webserver 415-b captures a second request (shown as capture modified app request 404) to access the app 420-b. In some embodiments, the captured app request (operation 402) may be modified (operation 403). The webserver 415-b then captures the modified app request (operation 404). Thus, in some embodiments, the second request includes a modified version of the first request, where the second request includes one or more identity dependencies received from the IAM module 416-b.

Transmission identifying module 112 may be configured to identify a transmission of one or more of the second request (i.e., modified app request) and the first request (i.e., unmodified app request) to the application. For example, the webserver 415-b may transmit app request (operation 406) to the app 420-b and the transmission identifying module 112 (not shown in FIG. 4B) may identify said transmission. As noted above, the IAM module (e.g., IAM module 416-b) may be optional in some embodiments. For example, in FIG. 5, the webserver 515 does not include the IAM module, in which case the webserver 515 captures the app request (operation 502) and transmits the unmodified app request to the app 520 in operation 503.

Response interception module 114 may be configured to intercept a response (e.g., from the application, from another entity, such as the IAM module), based at least in part on the transmission. For example, in FIG. 4B, the app 420-b transmits an app response (operation 407), and the webserver 415-b intercepts and captures this app response (operation 408). In some other cases, the response may include blocking the request. In one non-limiting example, the IAM module 416-b may block the request (e.g., modified app request, unmodified app request) from reaching the app 420-b. In other cases, for instance, when the IAM module is not present, the app 420-b may transmit an app response, where the app response indicates a denial or rejection of the app request (i.e., prevents the user from accessing the app). In such cases, as well, the discovery module captures and analyzes the response before relaying it to the user.

Analysis display module 116 may be configured to display, via at least one interface, an analysis of one or more of the first request, the modified version of the first request (i.e., the second request), and the response. The at least one interface may include one or more of a graphical user interface (GUI) and an application programming interface (API). By way of non-limiting example, the analysis may include determining at least one of requirements for application authentication, requirements for application authorization, one or more identity protocols utilized by the application, one or more identity techniques utilized by the application, whether application meets predetermined compliance standards, and whether any user-defined security requirements have been implemented.

By way of non-limiting example, the one or more identity protocols and techniques may include one or more of Security Assertion Markup Language (SAML), OpenID Connect (OIDC), Kerberos, and header-based authentication.

By way of non-limiting example, the predetermined compliance standards may include at least one of Payment Card Industry (PCI) standards, Health Insurance Portability and Accountability Act of 1996 (HIPAA) regulations, System and Organization Controls (SOC 2), and the use of Transport Layer Security (TLS).

By way of non-limiting example, the identity dependencies may include the requirements for application authentication and/or the requirements for application authorization. The requirements for application authentication and authorization may include multi-factor authentication (MFA) and rules governing access of application resources. As used herein, the term "application resources" may refer to resources (e.g., files, documents, static content, images, etc.) associated with an application (e.g., app 420-b). In some examples, at least one of the identity dependencies and the requirements for application authentication and authorization may include one or more differences between the second request and the first request. In some cases, the one or more differences between the second request (i.e., modified app request) and the first request (i.e., unmodified app request) may include at least one of custom HTTP headers, addition of custom cookies, and modification of one or more attributes in one or more of the first request and the second request.

By way of non-limiting example, the MFA information may include one or more of a username, a password, biometrics information (e.g., voice recognition, facial recognition, iris scan, retina scan, fingerprint, to name a few non-limiting examples), and single sign-on (SSO) policies.

In some embodiments, the predetermined compliance standards may include at least one of regulatory standards and customer-defined security requirements.

In some cases, the application may include a plurality of applications. In some cases, at least some of the plurality of applications may include different applications.

By way of non-limiting example, the migration from a legacy identity and access management (IAM) system to a new IAM system may include using a third-party system to pass from the legacy IAM system to the new IAM system one or more of the (1) identity dependencies, (2) requirements for application authentication and authorization, (3) one or more identity protocols utilized by the application, (4) one or more identity techniques utilized by the application, (5) predetermined compliance standards, and (6) user-defined security requirements. Other types of information may be passed between the legacy and the new IAM system during migration, and the examples listed herein are not intended to be limiting.

Request transformation module 118 may be configured to transform the second request (e.g., modified app request) from a first format to a second format. Additionally, or alternatively, the request transformation module 118 may be configured to transform the first request (i.e., unmodified app request) from a first format to a second format, where the second format is associated with the second request (i.e., modified app request).

By way of non-limiting example, the second format may be different than the first format and may include one or more of request headers (e.g., HTTP request headers), response headers (e.g., HTTP response headers), request bodies, response bodies, request methods, response methods, and cookies. In some examples, the headers (e.g., HTTP headers) in an app request may be referred to as request headers, while the headers (e.g., HTTP headers) in an app response may be referred to as response headers. Besides HTTP headers, the app request and app response may further include a request body and a response body, respectively. In some cases, the app request may include an indication of a request method, and the app response may include an indication of a response method. Furthermore, one or more of the app request and the app response may also include one or more cookies.

In some cases, one or more request headers included in the original app request may be modified. Additionally, or alternatively, one or more request headers (e.g., HTTP headers) may be added to the original app request during modification. For example, after receiving the app request (401), the legacy IAM module (or alternatively, the web-server 415-b) may modify one or more HTTP headers included in the app request, add one or more HTTP headers to the app request, or a combination thereof. In other words, one or more HTTP headers may be modified and/or added while transforming the first request from the first format to the second format. In some embodiments, the cookies may also include or more modified HTTP cookies, HTTP cookies that have been added to the original app request, or a combination thereof. That is, one or more HTTP cookies may be modified and/or added while transforming the first request from the first to the second format. Similarly, in some cases, the request and response bodies may include one or more of modifying and adding HTTP request bodies (or alternatively, HTTP request values). In one non-limiting example, one or more HTTP request bodies (or values) in a request body may be modified and/or one or more HTTP request bodies (or values) may added to the request body while transforming the first request from the first to the second format. In another example, one or more HTTP request bodies (or values) in a response body may be modified and/or added. In some embodiments, the request and response methods may include an HTTP request method.

In some implementations, by way of non-limiting example, the identity dependencies may include identity attributes received from an external attribute source, request headers, response headers, request bodies, response bodies, request methods, response methods, and cookies. In some implementations, by way of non-limiting example, the identity attributes may include one or more of a first name, a last name, an email address, group membership information, a role, a job title, a username, a phone number, a residential address, an employer department, a unique identifier or ID (e.g., an employee identification number, a social security number or SSN, or any other applicable unique identification number). In some implementations, by way of non-limiting example, the external attribute source may include one or more of a lightweight directory access protocol (LDAP) application protocol, a database, and a web service. Other types of external attribute sources known in the art are contemplated in different embodiments and the examples listed herein are not intended to limit the scope or spirit of the disclosure.

In some implementations, the HTTP headers may include custom HTTP headers (e.g., "X-Username: j doe" or "X-Groups: ["admins", "executives"]"). In some examples, the custom HTTP headers may include at least one of a username and a group. For instance, the custom HTTP headers may comprise one or more application user attributes for one or more users, where the one or more application user attributes are selected from a group consisting of a first name, a last name, an email address, group membership information, a role, a title, and a username.

In some implementations, the HTTP cookies may include custom HTTP cookies (e.g., "Cookie: username=jdoe;

groups=["admins", "executives"]"). In some cases, the custom HTTP cookies may comprise one or more of a username, a unique identifier (e.g., SSN, employee identification number, etc.), a group, and an encrypted value.

In some implementations, by way of non-limiting example, the HTTP request method may include at least one of a GET method, a HEAD method, a POST method, a PUT method, a DELETE method, a CONNECT method, a TRACE method, and a PATCH method. In some implementations, by way of non-limiting example, the HTTP response headers may include status codes, redirect locations, and query parameters. In some implementations, the user-defined security requirements may include at least one of MFA and a zero-trust security model.

In some implementations, the analyzing authentication and authorization requirements in the identity infrastructure may include analyzing authentication and authorization requirements in the identity infrastructure for migration from a first IAM system (e.g., legacy IAM system) to a second IAM system (e.g., new IAM system). In some implementations, by way of non-limiting example, the new IAM system may include an IAM system that comprises or supports a standard identity protocol and/or MFA. In some implementations, by way of non-limiting example, the standard identity protocol may include at least one of OIDC, SAML, and WebAuthn. The new IAM system may or may not be supported by a third-party, where the third-party includes a vendor.

In some implementations, computing platform(s) 102, remote platform(s) 104, and/or external resources 120 may be operatively linked via one or more electronic communication links. For example, such electronic communication links may be established, at least in part, via the network 150, such as the Internet and/or other networks. It will be appreciated that this is not intended to be limiting, and that the scope of this disclosure includes implementations in which computing platform(s) 102, remote platform(s) 104, and/or external resources 120 may be operatively linked via some other communication media.

A given remote platform 104 may include one or more processors configured to execute computer program modules. The computer program modules may be configured to enable an expert or user associated with the given remote platform 104 to interface with system 100 and/or external resources 120, and/or provide other functionality attributed herein to remote platform(s) 104. By way of non-limiting example, a given remote platform 104 and/or a given computing platform 102 may include one or more of a server, a desktop computer, a laptop computer, a handheld computer, a tablet computing platform, a NetBook, a Smartphone, and/or other computing platforms.

External resources 120 may include sources of information outside of system 100, external entities participating with system 100, and/or other resources. In some implementations, some or all of the functionality attributed herein to external resources 120 may be provided by resources included in system 100.

Computing platform(s) 102 may include electronic storage 122, one or more processors 124, and/or other components. Computing platform(s) 102 may include communication lines, or ports to enable the exchange of information with a network and/or other computing platforms. Illustration of computing platform(s) 102 in FIG. 1 is not intended to be limiting. Computing platform(s) 102 may include a plurality of hardware, software, and/or firmware components operating together to provide the functionality attributed herein to computing platform(s) 102. For example, computing platform(s) 102 may be implemented by a cloud of computing platforms operating together as computing platform(s) 102.

Electronic storage 122 may comprise non-transitory storage media that electronically stores information. The electronic storage media of electronic storage 122 may include one or both of system storage that is provided integrally (i.e., substantially non-removable) with computing platform(s) 102 and/or removable storage that is removably connectable to computing platform(s) 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 122 may include one or more virtual storage resources (e.g., cloud storage, a virtual private network, and/or other virtual storage resources). Electronic storage 122 may store software algorithms, information determined by processor(s) 124, information received from computing platform(s) 102, information received from remote platform(s) 104, and/or other information that enables computing platform(s) 102 to function as described herein.

Processor(s) 124 may be configured to provide information processing capabilities in computing platform(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same device, or processor(s) 124 may represent processing functionality of a plurality of devices operating in coordination. Processor(s) 124 may be configured to execute modules 108, 110, 112, 114, 116, and/or 118, and/or other modules (e.g., IAM module(s) 416, discovery module(s) 417 in FIGS. 4A-D; IAM module 516, discovery module 517 in FIG. 5). Processor(s) 124 may be configured to execute modules 108, 110, 112, 114, 116, and/or 118, and/or other modules by software; hardware; firmware; some combination of software, hardware, and/or firmware; and/or other mechanisms for configuring processing capabilities on processor(s) 124. As used herein, the term "module" may refer to any component or set of components that perform the functionality attributed to the module. This may include one or more physical processors during execution of processor readable instructions, the processor readable instructions, circuitry, hardware, storage media, or any other components. In other words, any of the modules described herein and elsewhere throughout the disclosure may be embodied in hardware, software, or a combination thereof.

It should be appreciated that although modules 108, 110, 112, 114, 116, and/or 118 are illustrated in FIG. 1 as being implemented within a single processing unit, in implementations in which processor(s) 124 includes multiple processing units, one or more of modules 108, 110, 112, 114, 116, and/or 118 may be implemented remotely from the other modules. The description of the functionality provided by the different modules 108, 110, 112, 114, 116, and/or 118 described below is for illustrative purposes, and is not intended to be limiting, as any of modules 108, 110, 112, 114, 116, and/or 118 may provide more or less functionality than is described. For example, one or more of modules 108, 110, 112, 114, 116, and/or 118 may be eliminated, and some or all of its functionality may be provided by other ones of modules 108, 110, 112, 114, 116, and/or 118. As another example, processor(s) 124 may be configured to execute one or more additional modules that may perform some or all of the functionality attributed below to one of modules 108, 110, 112, 114, 116, and/or 118.

FIGS. 2A through 2E illustrate methods 200-a through 200-e, respectively, for analyzing authentication and authorization requirements in an identity infrastructure, according to various aspects of the present disclosure. The operations of method(s) 200 presented below are intended to be illustrative. In some implementations, method(s) 200 may be accomplished with one or more additional operations not described, and/or without one or more of the operations discussed. Additionally, the order in which the operations of methods 200-a through 200-e are illustrated in FIGS. 2A-E and described below is not intended to be limiting.

In some implementations, method(s) 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method(s) 200 in response to instructions stored electronically on an electronic storage medium. The one or more processing devices may include one or more devices configured through hardware, firmware, and/or software to be specifically designed for execution of one or more of the operations of method(s) 200.

Figure 2A:
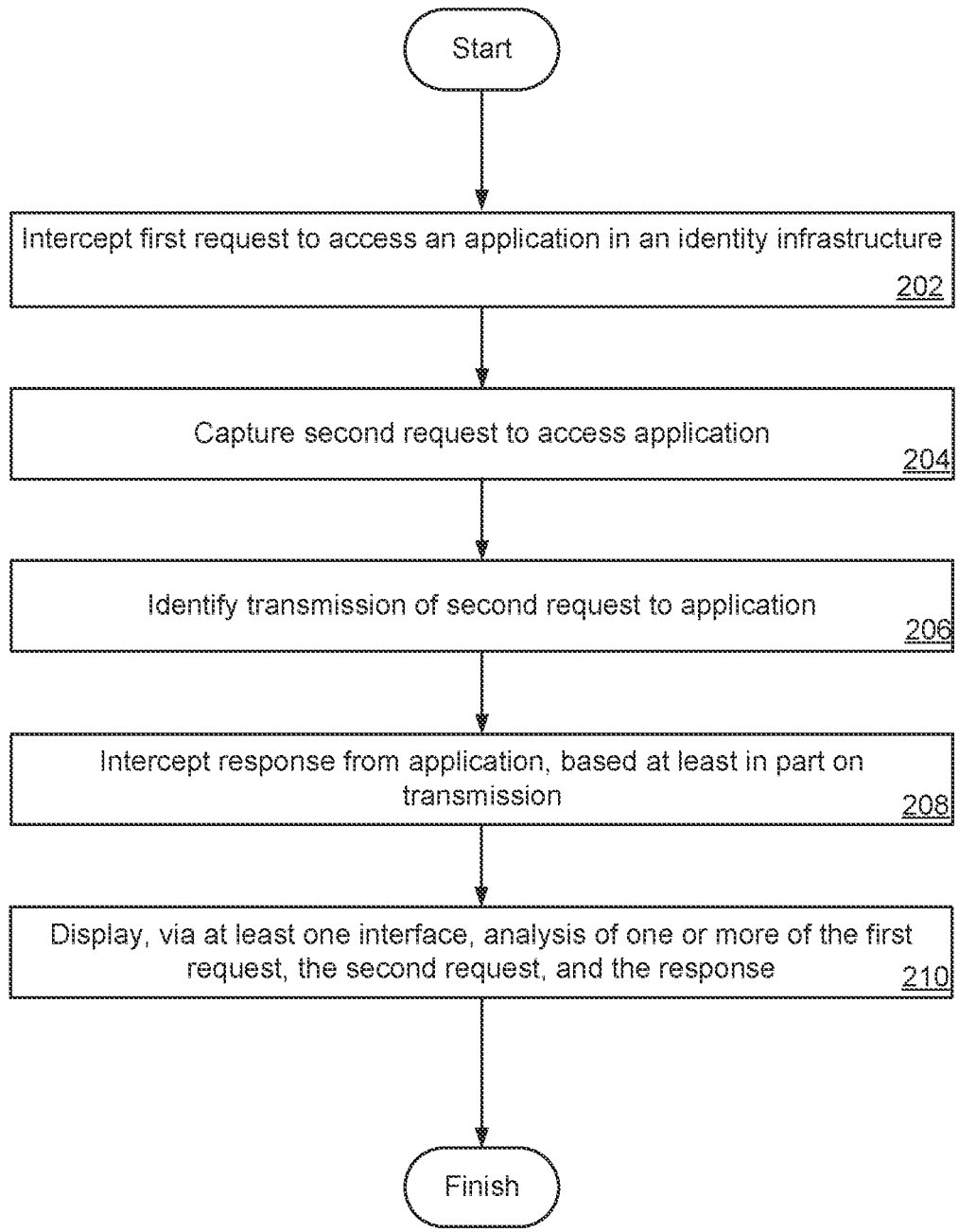
FIG. 2A illustrates an example of a method for analyzing authentication and authorization requirements in an identity infrastructure, in accordance with various aspects of the disclosure.

FIG. 2A illustrates a method 200-a, according to various aspects of the disclosure.

A first operation 202 may include intercepting, at a server (e.g., webserver 415-a, webserver 415-b), a first request to access an application (e.g., app 420-a, app 420-b) in the identity infrastructure. For instance, in FIG. 4B, the UE 475-b transmits app request (operation 401) and the webserver 415-b captures the app request (operation 402). First operation 202 may be performed by one or more hardware processors configured by machine-readable instructions including a module that is the same as or similar to request interception module 108, in accordance with one or more implementations.

A second operation 204 may include capturing a second request to access the application. The second request may include a modified version of the first request, where the first request has been modified to include one or more identity dependencies received from an IAM system. For instance, in FIG. 4B, the IAM module 416-b modifies the app request (operation 403), which is then subsequently captured (operation 404) by the webserver 415-b. Second operation 204 may be performed by one or more hardware processors configured by machine-readable instructions including a module that is the same as or similar to request capture module 110, in accordance with one or more implementations.

A third operation 206 may include identifying a transmission of the second request to the application. For instance, in FIG. 4B, the discovery module 417-b identifies a transmission of the second request from the webserver 415-b to the app 420-b, where the second request comprises a modified version of the first request. Third operation 206 may be performed by one or more hardware processors configured by machine-readable instructions including a module that is the same as or similar to transmission identifying module 112, in accordance with one or more implementations.

A fourth operation 208 may include intercepting a response from the application, based at least in part on the transmission. For instance, in FIG. 4B, the discovery module 417-b (or another module of the webserver 415-b) intercepts the app response transmitted from the app 420-b. FIG. 4B depicts this interception as capture app response 408, in accordance with one or more implementations. Fourth operation 208 may be performed by one or more hardware processors configured by machine-readable instructions including a module that is the same as or similar to response interception module 114, in accordance with one or more implementations.

A fifth operation 210 may include displaying, via at least one interface, an analysis of one or more of the first request, the modified version of the first request (i.e., the second request), and the response. The analysis may include determining at least one of requirements for application authentication, requirements for application authorization, one or more identity protocols utilized by the application (e.g., app 420-b in FIG. 4B), one or more identity techniques utilized by the application, whether application meets predetermined compliance standards, and whether any user-defined security requirements have been implemented. Fifth operation 210 may be performed by one or more hardware processors configured by machine-readable instructions including a module that is the same as or similar to analysis display module 116, in accordance with one or more implementations.

In some examples, the requirements for application authentication and authorization may comprise MFA and rules governing access of resources associated with the application. The MFA may comprise one or more a username, password, biometric information (e.g., fingerprint, retina or iris scan, voice recognition, facial recognition), and Single Sign-On (SSO) policies.

Figure 2B:
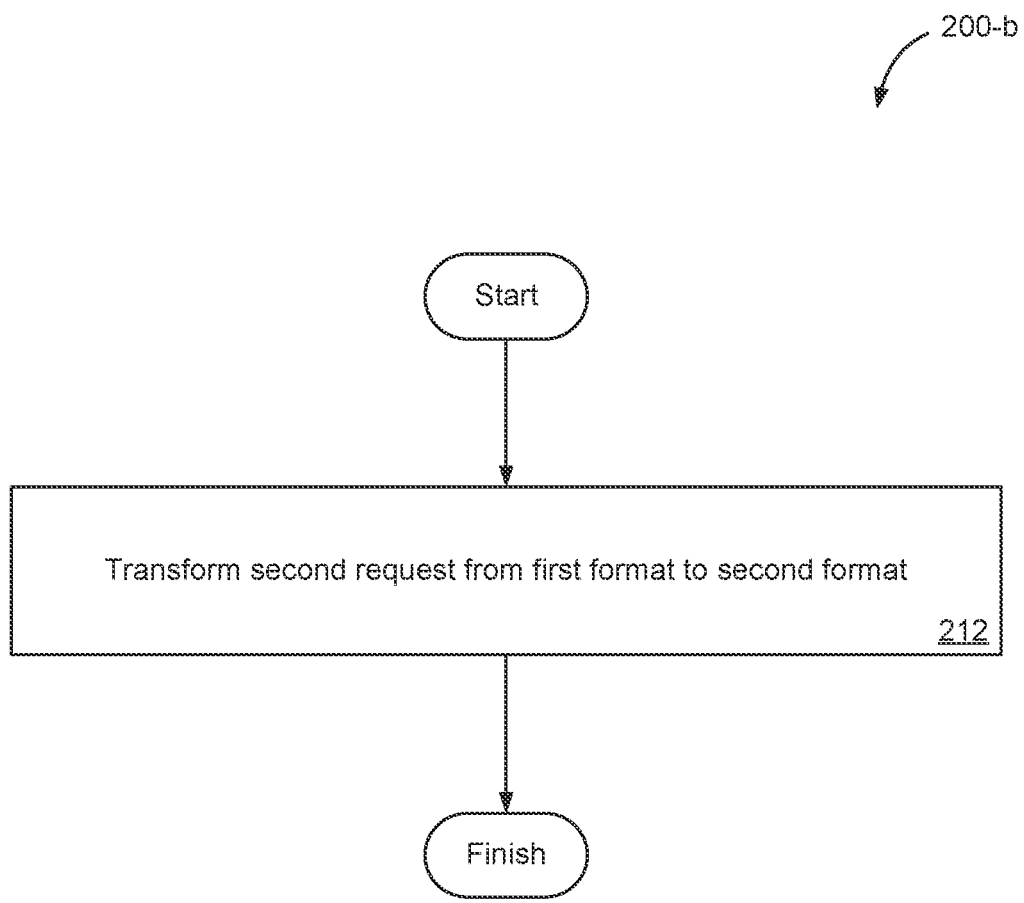
FIG. 2B illustrates a method for analyzing authentication and authorization requirements in an identity infrastructure, in accordance with various aspects of the disclosure.

FIG. 2B illustrates a method 200-b, according to various aspects of the present disclosure. Method 200-b implements one or more aspects of the method 200-a, described above in relation to FIG. 2A.

At first operation 212, the method 200-b may include transforming the first request (e.g., unmodified app request intercepted at first operation 202 in FIG. 2A) from a first format to a second format. The second format may be different than the first format and may include one or more of request and response headers, request and response bodies, request and response methods, and cookies. First operation 212 of method 200-b may be performed by one or more hardware processors configured by machine-readable instructions including a module that is the same as or similar to request transformation module 118, in accordance with one or more implementations.

As noted above, the request headers and response headers in the second format may comprise one or more modified HTTP headers, HTTP headers that have been added, or a combination thereof. In some examples, the cookies in the second format may include one or more modified HTTP cookies, HTTP cookies that have been added while transforming the first request from the first format to the second format, or a combination thereof. In some embodiments, the request bodies and response bodies in the second format may comprise one or more modified HTTP request bodies, HTTP request values that have been added, HTTP request bodies that have been added, or a combination thereof. In some embodiments, the request methods and response methods in the second format may comprise an HTTP request method.

Figure 2C:
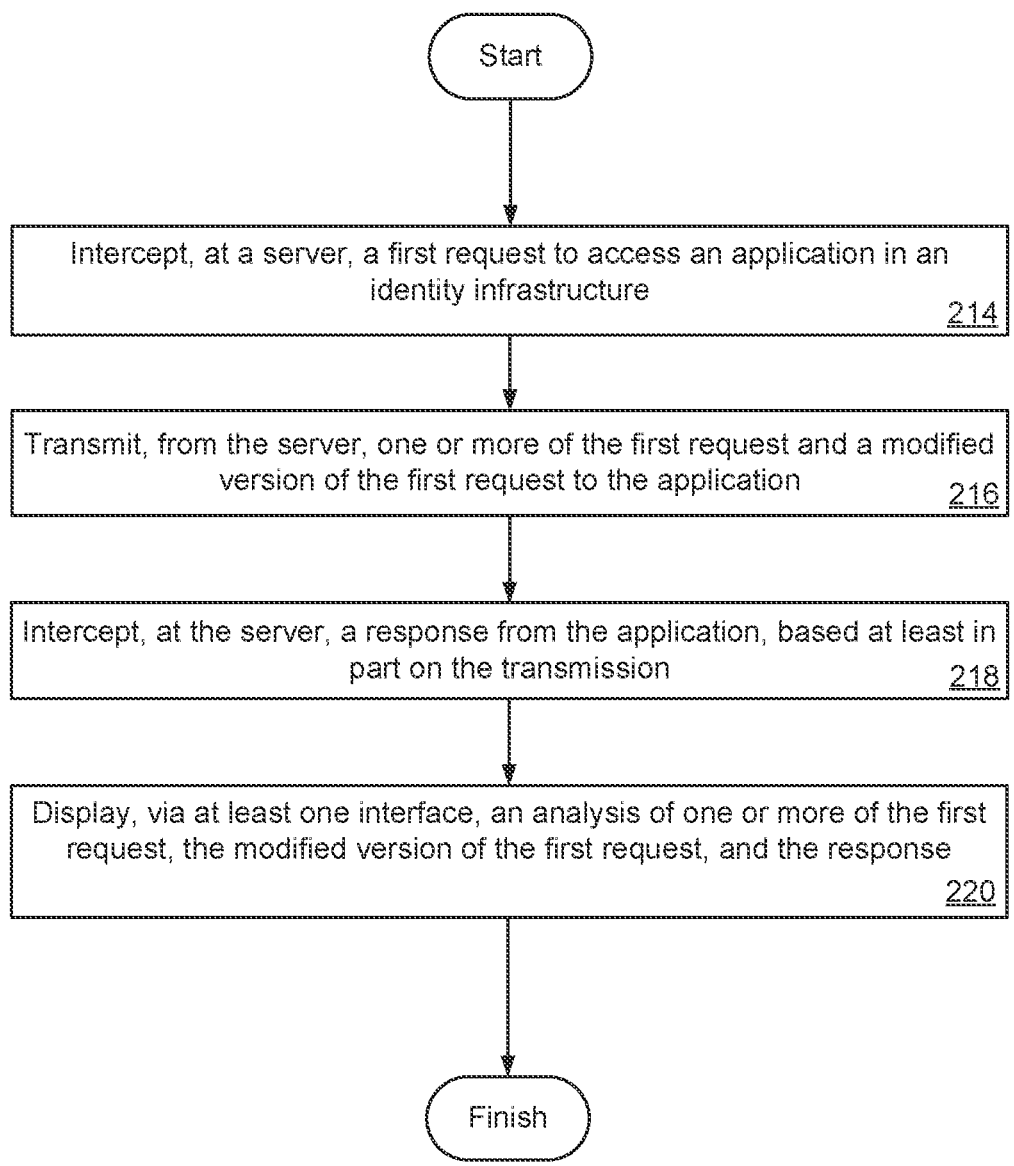
FIG. 2C illustrates a method for analyzing authentication and authorization requirements in an identity infrastructure, in accordance with various aspects of the disclosure.

FIG. 2C illustrates a method 200-c, according to various aspects of the disclosure.

A first operation 214 may include intercepting, at a server (e.g., webserver 515), a first request to access an application (e.g., app 530) in the identity infrastructure. First operation 214 may be performed by one or more hardware processors configured by machine-readable instructions including a module that is the same as or similar to request interception module 108, in accordance with one or more implementations.

A second operation 216 may include transmitting, from the server, one or more of the first request and a modified version of the first request to the application. In some cases, the first request may be modified to include one or more identity dependencies received from an IAM system. Second operation 216 may be performed by one or more hardware processors configured by machine-readable instructions including one or more modules that are the same as or similar to request capture module 110 and/or transmission identifying module 112, in accordance with one or more implementations.

A third operation 218 may include intercepting, at the server, a response from the application, based at least in part on the transmission. For instance, in FIG. 5, the discovery module 517 intercepts and captures the app response transmitted from the app 520 at operation 505. Third operation 218 may be performed by one or more hardware processors configured by machine-readable instructions including a module that is the same as or similar to response interception module 114, in accordance with one or more implementations.

A fourth operation 210 may include displaying, via at least one interface, an analysis of one or more of the first request, the modified version of the first request, and the response. The analysis may include determining at least one of requirements for application authentication, requirements for application authorization, one or more identity protocols utilized by the application, one or more identity techniques utilized by the application, whether application meets predetermined compliance standards, and whether any user-defined security requirements have been implemented. Fourth operation 220 may be performed by one or more hardware processors configured by machine-readable instructions including a module that is the same as or similar to analysis display module 116, in accordance with one or more implementations.

Figure 2D:
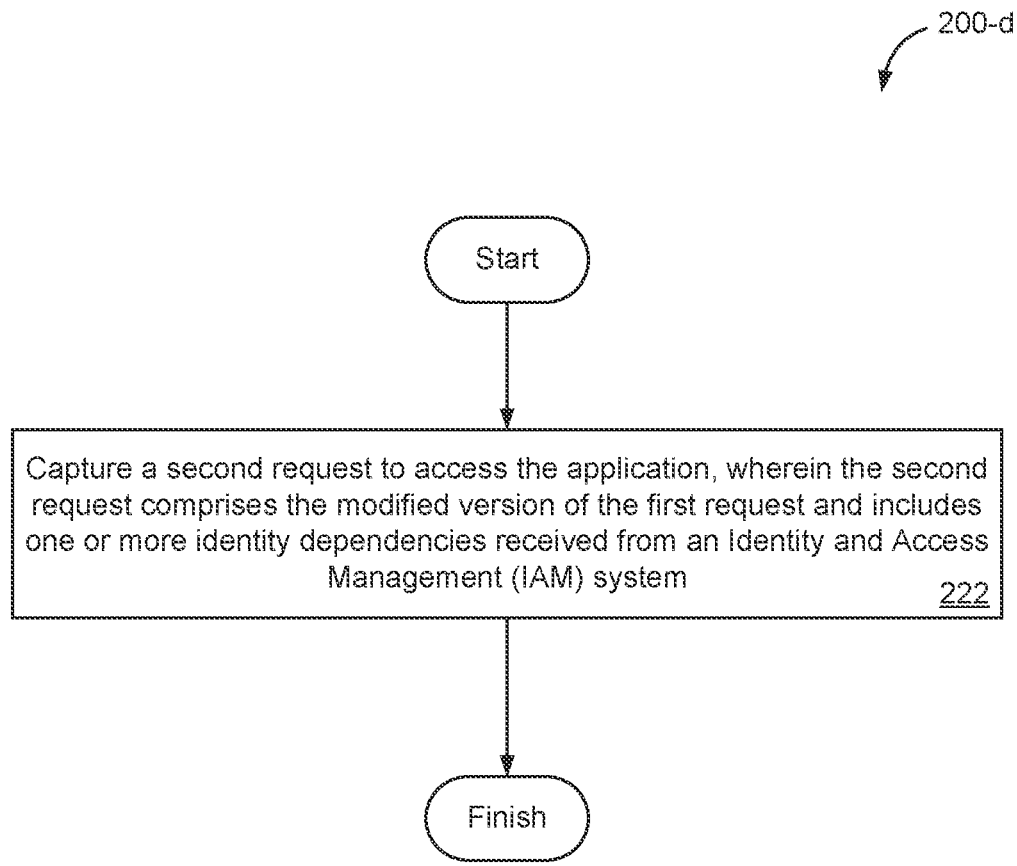
FIG. 2D illustrates a method for analyzing authentication and authorization requirements in an identity infrastructure, in accordance with various aspects of the disclosure.

FIG. 2D illustrates a method 200-d, according to various aspects of the present disclosure. Method 200-b implements one or more aspects of the method 200-c, described above in relation to FIG. 2C.

At first operation 222, the method 200-c may include capturing a second request to access the application, where the second request comprises the modified version of the first request and includes one or more identity dependencies received from an IAM system. First operation 222 of method 200-c may be performed by one or more hardware processors configured by machine-readable instructions including a module that is the same as or similar to request capture module 110, in accordance with one or more implementations.

Figure 2E:
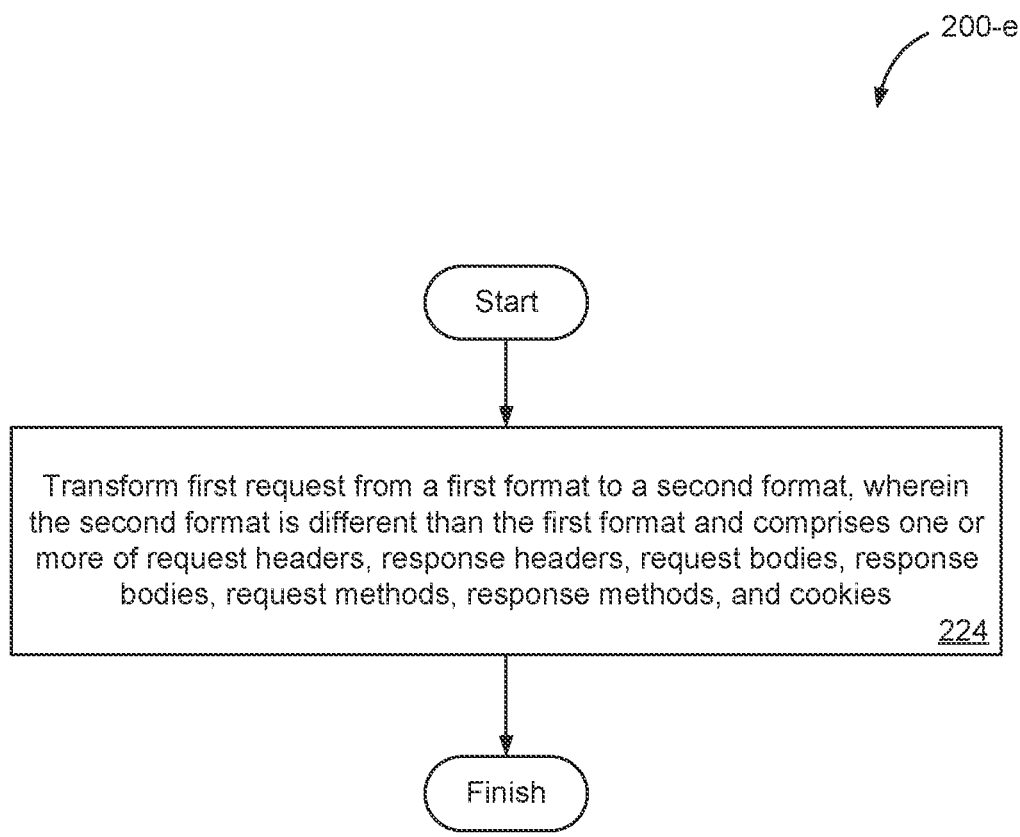
FIG. 2E illustrates a method for analyzing authentication and authorization requirements in an identity infrastructure, in accordance with various aspects of the disclosure.

FIG. 2E illustrates a method 200-e, according to various aspects of the present disclosure.

At first operation 224, the method 200-e may include transforming the first request (e.g., unmodified app request intercepted at first operation 214 in FIG. 2C) from a first format to a second format. The second format may be different than the first format and may include one or more of request and response headers, request and response bodies, request and response methods, and cookies. The second format may be associated with the second request (i.e., modified version of the first request). First operation 224 of method 200-e may be performed by one or more hardware processors configured by machine-readable instructions including a module that is the same as or similar to request transformation module 118, in accordance with one or more implementations.

FIG. 4A illustrates an example of a swim diagram 400-a depicting a method for analyzing authentication and authorization requirements in an identity infrastructure, in accordance with various aspects of the disclosure.

The method described in relation to FIG. 4A may be implemented using a computing platform (or computing system) that may be similar or substantially similar to the system 100 previously described in relation to FIG. 1. In this example, the system performing the analyzing of authentication and authorization requirements is depicted as the webserver 415-a, where the webserver 415-a comprises a discovery module 417-a and an optional IAM module 416-a (shown as optional by the dashed lines). In some instances, the IAM module 416-a may be associated with a legacy IAM system.

The swim diagram 400-a depicts the three stages of the discovery process, which include the capturing of application traffic (shown as capture block 451-a), the analysis of the captured traffic (shown as analyze block 452-a and analyze block 452-b), and the serving of an interface for presenting the results of the analysis to a user (shown as serve block 453-a and serve block 453-b). In this example, the webserver 415-a is electronically, logically, and/or communicatively coupled to a UE 405-a associated with a first user (e.g., discovery module user), a UE 475-a associated with a second user (e.g., application user), and an app 420-a.

Figure 4C:
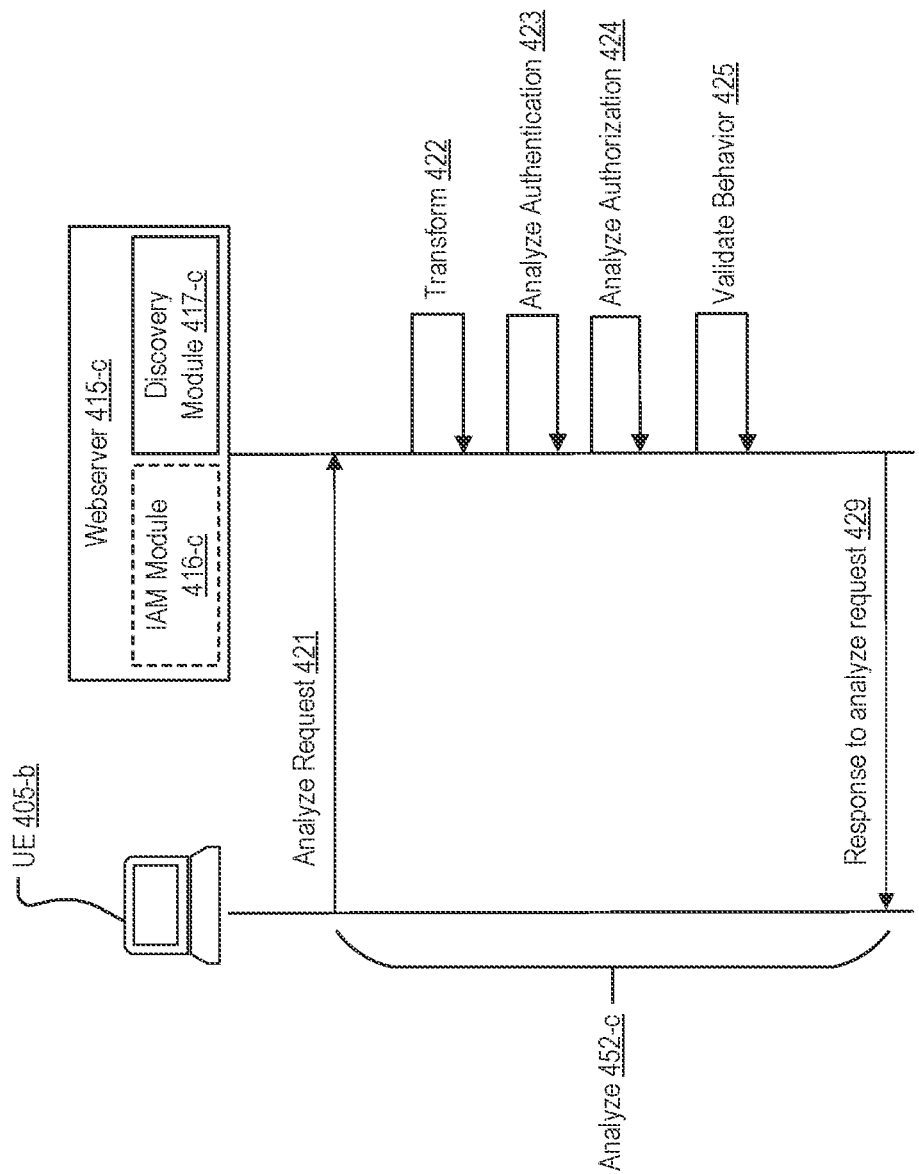
FIG. 4C illustrates a detailed swim diagram representation of the analysis process in FIG. 4A, in accordance with various aspects of the disclosure.
Figure 4D:
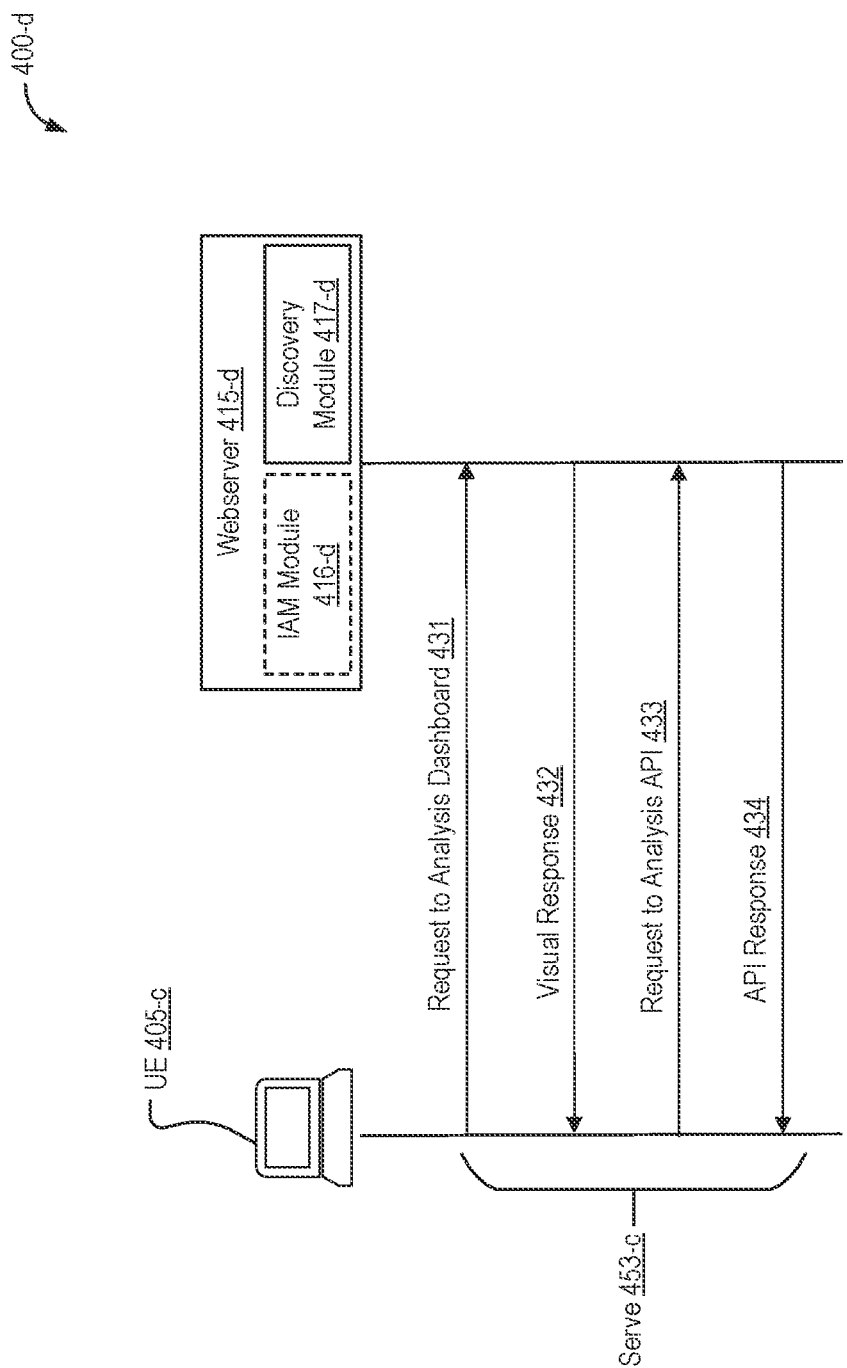
FIG. 4D illustrates a detailed swim diagram representation of the serving process in FIG. 4A, in accordance with various aspects of the disclosure.

As shown in FIG. 4A, the operations associated with the capture block 451-a are performed between the application user's UE 475-a, the webserver 415-a, and the app 420-a. Additionally, the operations associated with analyze blocks 452-a and 452-b are performed by the UE 405-a and the webserver 415-a. Lastly, the operations associated with serve blocks 453-a and 453-b are performed by the UE 405-a and the webserver 415-b. FIGS. 4B-4D provide a more detailed view of the capturing block 451-a, the analyze blocks 452, and the serving blocks 453, respectively.

FIG. 4B illustrates an example of a swim diagram 400-b depicting the request and response capturing by a discovery module 417-b of a webserver 415-b, according to various aspects of the disclosure. Specifically, but without limitation, FIG. 4B depicts the various operations associated with capture block 451-b, where the capture block 451-b is similar or substantially similar to the capture block 451-a in FIG. 4A. The operations described in relation to FIG. 4B may be performed by one or more of a UE 475-b associated with an application user, the webserver 415-b, the discovery module 417-b, the IAM module 416-b, and the app 420-b. In some embodiments, the IAM module 416-b may be optional (shown as optional by the dashed lines).

In some embodiments, the discovery module 417-b may be installed on the webserver 415-b, where the webserver 415-b may further comprise the IAM module 416-b (optional). In some cases, the IAM module 416-b may be associated with a legacy IAM system (e.g., an IAM system used prior to identity migration to a new or modern IAM system). Some non-limiting examples of webservers include an APACHE webserver, an IBM HTTP Server (IHS), an ORACLE HTTP Server (OHS), and a NGINX webserver. It should be noted that other types of webservers are also contemplated in different embodiments and the examples listed herein are not intended to limit the scope and/or spirit of the disclosure. As part of the capturing process, the discovery module 417-b detects one or more actions (e.g., modifications) being performed on the application request by the IAM module 416-b of the webserver 415-b.

As seen in FIG. 4B, a first operation 401 comprises transmitting an app request from the UE 475-b. In some cases, the app request is intercepted at the webserver 415-b. In accordance with aspects of the present disclosure, the discovery module 417-b identifies one or more external systems (if any) that the app 420-b queries in order to determine one or more of an authentication status and an authorization status for the user associated with the UE 475-b. For example, in some circumstances, the IAM module 416-b loads identity attributes from at least one external attribute source (e.g., a LDAP associated with the app 420-b, a database, a web service, another identity system, etc.). In some embodiments, the database comprises a relational database, although other types of databases are also contemplated in different embodiments. In some instances, the IAM module 416-b also modifies request headers included in the app request and/or adds request headers to the app request prior to forwarding the request to the app 420-b.

In some cases, at operation 402, the discovery module 417-b captures the app request transmitted from the UE 475-b.

Next, at operation 403, the IAM module 416-b modifies the app request. In some instances, the IAM module adds one or more HTTP headers to the app request, which may help identify the end-user to the application.

In some cases, at operation 404, the discovery module 417-b captures the modified app request, where the modified app request comprises a modified version of the original app request and includes one or more identity dependencies received from the legacy IAM system (or IAM module 416-b). As noted above, the identity dependencies may comprise one or more identity attributes received from an external attribute source, request headers, response headers, request bodies, response bodies, request methods, response methods, and/or cookies.

After capturing the modified app request (operation 404), the webserver 415-b transmits one of the original/unmodified app request or the modified version of the app request to the app 420-b at operation 406. At operation 406, the method comprises transmitting an app response from the app 420-b to the webserver 415-b. Additionally, at operation 408, the method comprises capturing the app response by the discovery module 417-b.

In some cases, the webserver 415-b relays the app response to the UE 475-b at operation 409. In other cases, the IAM module 416-b may deny the application request to access the app 420-b, for instance, based on validating the user credentials provided by the application user and/or a risk assessment of the app request, to name two non-limiting examples. In one non-limiting example, the IAM module 416-b blocks the app request (e.g., original/unmodified app request received at operation 401) from reaching the app 420-b. In such cases, capturing the response at operation 408 comprises capturing a response from the IAM module 416-b blocking the app request from reaching the app 420-b. Additionally, relaying the app response at operation 409 comprises transmitting a response indicating that the app request was blocked from reaching the app 420-b.

Turning now to FIG. 4C, which illustrates an example of a swim diagram 400-c depicting the analysis of the captured application data by a discovery module 417-c, according to various aspects of the disclosure. In some cases, the captured application data may include one or more of the app request, modified app request, and app response captured by the discovery module. Specifically, but without limitation, FIG. 4C depicts the various operations associated with analyze block 452-c, where the analyze block 452-c corresponds to the analyze blocks 452-a and 452-b in FIG. 4A. The operations described in relation to FIG. 4C may be performed by one or more of a UE 405-b associated with a discovery module user, the webserver 415-c, the discovery module 417-c, and the IAM module 416-c. In some embodiments, the IAM module 416-c may be optional (shown as optional by the dashed lines).

In some embodiments, at operation 421, the discovery module 417-c of the webserver 415-c receives a request to analyze the captured data, where the analyze request is received from the UE 405-b.

At operation 422, the discovery module 417-c transforms the captured data into a format suitable for analysis. In some cases, the schema or format used to represent application traffic (e.g., network traffic associated with the app request, app response, etc.) comprises the fields of the HTTP requests. In some instances, application traffic represented using a standard schema or format facilitates analysis of authentication and authorization requirements in an identity infrastructure. In one non-limiting example, the schema or format may include the original request (e.g., unmodified app request, which may be an HTTP request, received from the application user), the modified request (e.g., modified version of the original request transmitted from the IAM module to the app), and the delta or difference between the original and modified requests. For example, with reference to FIG. 4B, the schema/format may include the app request (transmitted at operation 401 and captured at operation 402), the modified app request (modified at operation 403 and captured at operation 404), and one or more differences between the two. In some cases, the discovery module 417-c is configured to capture at least a portion (or all) of the fields of the HTTP request(s). In some cases, the schema or format may also include the HTTP response received from the app, for instance, the app response transmitted from the app 420-b at operation 407 and captured by the discovery module 417-b at operation 408.

Further, the discovery module 417-c assesses one or more of the authentication and authorization requirements for the app. The assessment may include the discovery module 417-c performing an analysis of the information needed by the app in order to consume identity data. In one non-limiting example, the discovery module 417-c determines one or more of the app's authentication requirements, authorization requirements, and attribute loading requirements. As used herein, the term "authorization" refers to the rules governing access of application resources. Some non-limiting examples of application resources include files, documents, static content, images, etc., associated with the application. In some cases, a user (e.g., user associated with UE 475-b in FIG. 4B) may need to be authorized to access the application and/or resources associated with the application. Further, the term "authentication" refers to the process of confirming that an application user is who they say they are (e.g., via a username/password, MFA, biometric information, such as fingerprint, voice recognition, retina or iris scan, facial recognition, single sign-on or SSO policies, to name a few non-limiting examples). In other words, the discovery module 417-c determines the type of information required by the IAM module 416-c to validate the identity of the application user, confirm that the application user is authorized to access the application, etc., before the application user is granted access to the application. In some examples, the discovery module 417-c may also analyze the user attributes required for the application to build its identity context (i.e., the context needed for the app to determine which user(s) it is currently interacting with, what permissions they should have within the app, to name two non-limiting examples).

In some cases, the discovery module 417-c is configured to determine the type of information required by an application (e.g., app 420-b) to assess whether an app request is considered authenticated and authorized. Typical requirements include, but are not limited to, the addition of custom HTTP headers (e.g., "X-Username: jdoe" or "X-Groups: ["admins", "executives"]") and HTTP cookies (e.g., "Cookie: usernameH doe; groups=["admins", "executives"]"). In some embodiments, the discovery module 417-c analyses one or more of HTTP request headers (e.g., standard and custom headers), HTTP cookies, request methods, HTTP request bodies, HTTP response headers (e.g., status codes, redirect locations, query parameters), and/or HTTP response bodies that are used to define the authentication and authorization requirements in the identity infrastructure.

In some cases, the transformation process 422 performed by the discovery module 417-c comprises determining one or more differences between the original request (i.e., app request before it is modified by the IAM module) and the final request (i.e., modified app request sent to the app). In some instances, the legacy IAM module may modify the HTTP headers (e.g., standard headers) received in the app request to generate one or more custom HTTP headers. Additionally, or alternatively, the legacy IAM module may add one or more HTTP headers to the original app request, delete one or more HTTP headers included in the original app request, or a combination thereof. In such cases, the HTTP headers included in the modified app request may be referred to as "custom HTTP headers". In some cases, HTTP headers may be grouped according to their context. For instance, HTTP request headers may include information about the resource (e.g., file, document, URL path, etc.) to be fetched, or about the client requesting the resource. In some cases, HTTP response headers may include additional information about the response, for instance, its location or about the server providing the response. Representation headers may include information about the body of the resource, such as, but not limited to, its Multipurpose Internet Mail Extensions (MIME) type, or encoding/compression applied to the body of the resource. Payload headers may include representation-independent information about payload data, including content length and/or the encoding used for transport. It should be noted that the types of HTTP request/response headers described herein are not intended to be limiting and other types of headers known in the art are contemplated in different embodiments.

In some examples, at operations 423 and 424, the discovery module 417-c also determines the identity protocol or technique (e.g., SAML, OIDC, Kerberos, header-based auth) being leveraged for application authentication and authorization, respectively. Furthermore, at operation 425, the discovery module 417-c validates the behavior of the legacy IAM module 416-c against one or more of compliance and regulatory standards, where the behavior comprises one or more of the authentication behavior and authorization behavior. For instance, the discovery module 417-c (or another module of the system 100) determines if the app meets predetermined compliance and regulatory standards. Some non-limiting examples of predetermined compliance standards comprise at least one of regulatory standards and customer-defined security requirements. In some cases, the predetermined compliance standards may include at least one of Payment Card Industry (PCI) Data Security Standard, Health Insurance Portability and Accountability Act (HIPAA) rules, System and Organization Controls (SOC2) compliance standard, and/or the use of Transport Layer Security (TLS). In some cases, the user or customer defined security requirements may comprise determining whether at least one of MFA and a zero-trust security model is being employed for accessing the application.

At operation 429, the method comprises transmitting a response to the UE 405-b, where the response includes the information determined at operations 422-425. In some cases, the response is transmitted in response to receiving the analyze request at operation 421.

FIG. 4D illustrates an example of a swim diagram 400-d, according to various aspects of the disclosure. As seen, swim diagram 400-d depicts the various operations of serving block 453-c, where serving block 453-c corresponds to the serving blocks 453-a and 453-b described above. In some cases, the discovery module 417-d is configured to serve the output of the analysis (described in relation to FIG. 4C) to an end-user (e.g., a discovery module user associated with UE 405-c). The operations depicted in swim diagram 400-d may be performed by one or more of the UE 405-c, a webserver 415-d, an optional IAM module 416-d, and a discovery module 417-d. The UE 405-c may be similar or substantially similar to one or more of the UEs 405-a and 405-b described in relation to FIGS. 4A and 4C, respectively. Additionally, the webserver 415-d, the IAM module 416-d, and the discovery module 417-d may be similar or substantially similar to the ones described in relation to FIGS. 4A-C. In some embodiments, the IAM module 416-d may be optional (shown as optional by the dashed lines).

As shown in FIG. 4D, at operation 431, the webserver 415-d receives a request to access an analysis dashboard from the UE 405-c. In some cases, the discovery module 417-d is configured to display an output of the analysis through an interface (e.g., GUI and/or an API) of the UE 405-c, which enables the discovery module user to consume insights of the identity infrastructure. At operation 432, the discovery module 417-d provides a visual response comprising an output of the analysis (described in relation to FIG. 4C) to the UE 405-c.

In some cases, at operation 433, UE 405-c transmits a request to an analysis API associated with the discovery module 417-d. For example, the request may include a request to access additional information that was captured and/or analyzed by the discovery module during the capturing and analysis processes described in relation to FIGS. 4B and 4C. In some instances, at operation 434, the webserver 415-d transmits an API response to the UE 405-c, where the API response comprises a response to the request received at operation 433. In some cases, the API response may comprise the response body, HTTP headers, cookies, and/or the HTTP status codes, although other types of information may also be included in the API response.

Thus, some aspects of the disclosure are directed to a visual interface and/or an API to provide an end-user with information related to authentication and authorization behavior in the identity infrastructure. Additionally, or alternatively, aspects of the present disclosure are directed to a system (e.g., system 100, webserver 415-d, discovery module 417-d) that can assist end-users with identifying the different steps, procedures, etc., required to migrate an application (e.g., app 420-a) from a legacy IAM system (e.g., associated with legacy IAM module 416-d) to a new or modern IAM system. In some cases, the authentication behavior may dictate how an application, such as app 420-a in FIG. 4A, identifies a user. For example, the app 420-a may identify a user through the use of custom HTTP headers and custom cookies. During the analysis process, the discovery module (e.g., discovery module 417-c) identifies information related to, for instance, the HTTP request values utilized by the app to build its identity context. Furthermore, during the serving process, the discovery module 417-d presents the information determined during the analysis process to the discovery module user, which can assist the discovery module user in migrating the application(s) to a new or modern IAM system. For example, the discovery module 417-d may display information related to the exact HTTP request values that are utilized by the application (e.g., app 420-a) to build the identity context. Knowledge of these HTTP request values can help optimize migration of the app to the new or modern IAM system. As an example, after migration, the system (e.g., system 100) of the present disclosure may interface with a new identity system (e.g., OKTA, MICROSOFT AZURE, to name a few non-limiting examples) to load identity attributes and authenticate and authorize users. Furthermore, the system 100 may pass the same or similar HTTP request values (i.e., as the ones provided before migration) to the application. Such a design may allow application users of an enterprise/company to use the new or modern IAM system for authentication and authorization (e.g., while attempting to access the application), while minimizing the amount of changes to the application to ensure compatibility with the new/modern IAM system. Thus, in some aspects, the app is "unaware" of the migration as it continues to receive the same or similar HTTP request values that it received prior to migration. As such, the present disclosure may facilitate migration to a new or modern IAM system while minimizing changes to the app and/or user experience.

FIG. 5 illustrates another example of a swim diagram 500 depicting the request and response capturing by a discovery module 517 of a webserver 515, according to various aspects of the disclosure. Specifically, but without limitation, FIG. 5 depicts the various operations associated with capture block 551, where the capture block 551 implements one or more aspects of the capture block(s) 451-a and/or 451-b in FIGS. 4A and/or 4B, respectively. The operations described in relation to FIG. 5 may be performed by one or more of a UE 575 associated with an application user, the webserver 515, the discovery module 517, and the app 520. In contrast to FIG. 4B, the webserver 515 in FIG. 5 does not include a legacy IAM module. In some instances, one or more of the operations or steps performed by the discovery module 517 may be substantially identical regardless of whether the legacy IAM module (e.g., IAM module 416-a in FIG. 4A) is present. Additionally, or alternatively, with regards to functionality, the discovery module 57 may implement one or more aspects of the discovery module(s) 417 (e.g., discovery module 417-a, discovery module 417-b).

In some embodiments, the discovery module 517 may be installed on the webserver 515. Some non-limiting examples of webservers include an APACHE webserver, an IBM HTTP Server (IHS), an ORACLE HTTP Server (OHS), and a NGINX webserver. It should be noted that other types of webservers are also contemplated in different embodiments and the examples listed herein are not intended to limit the scope and/or spirit of the disclosure.

As seen in FIG. 5, a first operation 501 comprises transmitting an application request from the UE 575. In some cases, the app request is intercepted at the webserver 515. In accordance with aspects of the present disclosure, the discovery module 517 identifies one or more external systems (if any) that the application 520 queries in order to determine one or more of an authentication status and an authorization status for the user associated with the UE 575. For example, in some circumstances, the app 520 (or alternatively, the webserver 515) loads identity attributes from at least one external attribute source (e.g., a LDAP associated with the app 520, a database, a web service, another identity system, etc.). In some embodiments, the database comprises a relational database, although other types of databases are also contemplated in different embodiments. In some embodiments, the discovery module 517 analyzes the app request, where analyzing the app request includes analyzing HTTP headers, cookies, bodies, etc., in the app request to make determinations about the identity system(s) and/or identity dependencies in place. As noted above, the identity dependencies may comprise one or more identity attributes received from an external attribute source (e.g., shown as attributes system 626 and LDAP 633 in FIG. 6), request headers, response headers, request bodies, response bodies, request methods, response methods, and/or cookies. By way of non-limiting example, the identity attributes may comprise one or more of an email address, a phone number, a residential address, a job title, an employer department, and an employee ID. Typically, though not always, when the legacy IAM module is not present, the app 520 is configured to load one or more user attributes that are produced as part of the authentication process (e.g., produced via SAML or OIDC).

In some embodiments, the discovery module 517 may also inspect the app request (i.e., received at operation 501) and/or the app response (i.e., received at operation 504) to determine if an identity protocol (e.g., OIDC, SAML, Simple and Protected GSSAPI Negotiation Mechanism or SPNEGO, KERBEROS, etc.) is being utilized. Additionally, or alternatively, the discovery module 517 analyzes the app request to determine whether the app 520 meets one or more predefined compliance standards. Some non-limiting examples of compliance standards may include one or more of regulatory standards and customer-defined security requirements, including at least one of PCI Data Security Standard, HIPAA rules, SOC2 compliance standard, and/or the use of TLS.

In some examples, when there is no legacy IAM module present, the app request is not modified at the webserver 515 prior to transmission to the app 520. As noted above, when the webserver (e.g., webserver 415-b in FIG. 4B) includes an IAM module, the IAM module may modify HTTP headers in the app request and/or add new HTTP headers to the app request prior to forwarding the app request to the application.

In some cases, at operation 502, the discovery module 517 captures the app request received from the UE 575. Next, at operation 503, the discovery module 517 (or alternatively, the webserver 515) transmits the app request to the app 520.

In some cases, the app 520 transmits an app response to the webserver 515 at operation 504. At operation 505, the method comprises capturing, by the discovery module 517 of the webserver 515, the app response.

In some cases, at operation 506, the app response is transmitted from the webserver 515 to the UE 575. The discovery module 517 may analyze the application traffic (e.g., app request, app response), where the analyzing includes determining (1) if an identity protocol (e.g., OIDC, SAML, SPNEGO, KERBEROS, etc.) is being utilized, (2) whether the app 520 meets predetermined regulatory/compliance standards, (3) one or more requirements for application authentication and application authorization, (4) one or more identity techniques utilized by the app 520, and/or (5) whether any user-defined security requirements have been implemented in the identity infrastructure.

By way of non-limiting example, the requirements for application authentication and authorization may comprise MFA and rules governing access of resources (e.g., documents, files, static content, images, strings, etc.) associated with the app 520. In some examples, the term "resource" may be used generally to describe an HTTP endpoint exposed by the app 520. Specifically, but without limitation, the term "resource" may refer to a path of a uniform resource locator (URL). For example, while interacting with the app 520, a user may navigate across a plurality of resources (e.g., https://example.com/dashboard, https://example.com/admin, https://example.com/accounting, etc.), where each URL path/resource is associated with one or more additional resources (e.g., images, files, etc.).

Figure 6:
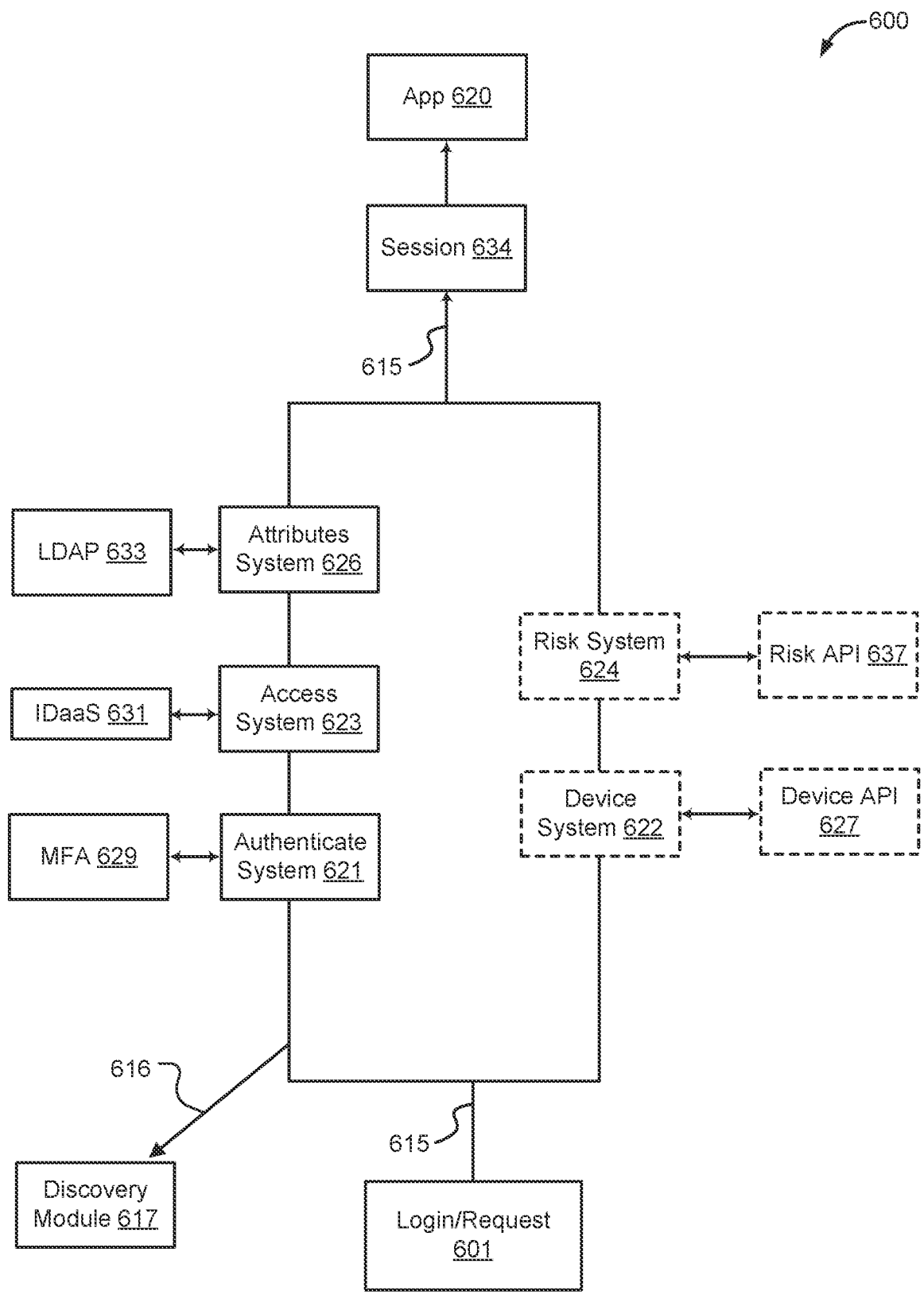
FIG. 6 illustrates an example of an identity infrastructure comprising a discovery module for analyzing authentication and authorization requirements in the identity infrastructure, according to various aspects of the disclosure.

Turning now to FIG. 6, which illustrates an example of an identity infrastructure 600 comprising a discovery module 617, according to various aspects of the disclosure. In some examples, the discovery module 617 (or any of the other modules described in relation to FIG. 1) may be configured for analyzing authentication and authorization requirements in the identity infrastructure 600. In some cases, this analysis of the identity infrastructure 600 may begin by installing the discovery module 617 on or near an existing identity infrastructure element, such as the webserver 415-*a* in FIG. 4A. As used herein, a discovery module may refer to an autonomous or semi-autonomous software entity that assesses application requests, application responses, and/or modified application requests (if applicable) within an identity infrastructure and presents an analysis of the same via an interface (e.g., GUI or API, to name two non-limiting examples) on a user device.

As noted above, identity information may comprise identity data, identity metadata, structure and/or contents of identity sessions, as well as configuration and deployment information for software and hardware entities of an identity system/domain. In some cases, the discovery module 617 may intercept and/or proxy an identity dataflow 615 as it is relayed to any of the identity infrastructure elements (e.g., authenticate system 621, access system 623, attributes system 626, risk system 624, device system 622) for authentication, authorization, gathering identity attributes, etc. FIG. 6 depicts the discovery module 617 intercepting 616 the networking traffic (or identity dataflow 615) in the identity infrastructure. In some examples, the various identity infrastructure elements depicted in FIG. 6 may be associated with an IAM system, such as a new/modern IAM system utilized to control access to the app 620 following migration. In some cases, the app 620 may be "unaware" of this migration and may continue to base its access decisions based on the HTTP request values, headers, cookies, HTTP request bodies, etc., it previously expected. In other cases, the identity infrastructure elements shown in FIG. 6 may be associated with a legacy IAM system (i.e., IAM system utilized to control access to the app 620 before migration).

In this example, a user is attempting to access a protected resource, such as an app 620. As shown, the process flow 600 may begin by a login/request 601 from the user. Login/request 601 may comprise receiving identity data, including one or more of a username, a password, biometrics information (e.g., a fingerprint, iris scan, voice input, facial recognition), a unique identifier or pin, etc. In some cases, the login/request 601 may also include a request to access the app 620. Following login, the user input may be relayed to any one of the runtime systems as an identity dataflow 615. In some cases, the discovery module may intercept 616 the networking traffic (i.e., within the identity dataflow 615), where the intercepting comprises at least capturing the request to access the app 620. The discovery module may also determine which identity infrastructure elements are utilized, as well as how they are utilized, to grant/deny user access to the app 620.

As seen, the identity dataflow 615 may be sent to one or more identity infrastructure elements, such as an authenticate system 621, an access system 623, an attributes system 626, a device system 622 (shown as optional by the dashed lines), and/or a risk system 624 (optional) associated with an identity domain (e.g., a legacy IAM system). In some cases, the identity dataflow 615 may be sent to other systems not identified herein. In some cases, the authenticate system 621 may support MFA 629, the access system 623 may support identity as a service (IDaaS) 631 for authorization, and the attributes system 626 may be linked or associated with a LDAP 633 for gathering identity attributes. In some implementations, the access system 623 may enforce decisions about authentication and authorization set by the IDaaS system 631.

In some embodiments, the discovery module 617 may determine at least one of requirements for application authentication, requirements for application authorization, one or more identity protocols utilized by the app 620, and one or more identity techniques utilized by the app 620, based on the intercepting 616. In some implementations, the discovery module 617 may also determine whether the app 620 meets predetermined compliance or regulatory standards and/or whether any user-defined security requirements have been implemented in the identity infrastructure 600. Additionally, or alternatively, the discovery module 617 may also detect the configuration and behavior of the above identity infrastructure elements, where the configuration may include identity data and identity metadata stored within the identity infrastructure elements. Behavior may comprise identity operations performed by the elements of the identity infrastructure 600. In some cases, assessing the authentication/authorization requirements in the identity infrastructure 600 by the discovery module 617 may be based at least in part on detecting and assessing one or more identity-centric operations, as described with respect to the identity data, identity metadata, identity dependencies received from an IAM system, and identity infrastructure elements.

In some cases, the one or more identity-centric operations may comprise modifying the app request to include one or more identity dependencies received from an IAM system and transmitting the modified app request to the app 620. As noted above, the identity dependencies may comprise identity attributes received from an external attributes source (e.g., attributes system 626 and LDAP 633). The identity-centric operations and behavior may also comprise one or more of enforcing authentication rules based on an authentication performed by the user (e.g., login 601 and authentication by authenticate system 621), granting or denying access to a protected resource (e.g., based on the request to access the app 620), and enforcing authorization rules (e.g., using access system 623).

In some embodiments, the identity dependencies received from the IAM system may also include one or more of request headers (e.g., HTTP request headers), response headers (e.g., HTTP response headers), request bodies, response bodies, request methods, response methods, and cookies. In some examples, the app request may be an example of a HTTP request and the response received from the app 620 may be an example of a HTTP response. An HTTP request is made by a client (e.g., UE 575 in FIG. 5) to a named host, which is located on a server. The aim of the request is to access a resource (e.g., app 620) on the server. In some examples, to make the request, the client uses components of a URL, which includes the information needed to access the resource. In some cases, the HTTP request includes one or more of a request line, a series of HTTP headers or header fields, a message body (if needed). The request line, which may be the first line in the HTTP request message, may include a method (e.g., GET, POST, PUT, HEAD, DELETE, PATCH, OPTIONS, CONNECT, and/or a TRACE method), a path component of the URL for the HTTP request, and a HTTP version number or specification. Additional information may be included in the request line in some embodiments, and the examples listed herein are not intended to be limiting. HTTP headers included in the request message may be used to provide the recipient (e.g., app 620, IAM system, or another applicable entity) with information about the HTTP request message, the sender, and the way in which the sender wants to communicate with the recipient. In some cases, each HTTP header comprises a name and a value.

In some embodiments, the identity dependencies may also comprise the requirements for authentication and authorization. In some implementations, the requirements for authentication and authorization may comprise one or more of modifying/adding HTTP headers, HTTP values, and HTTP cookies in the HTTP request, the HTTP response, or both. In some embodiments, the modified HTTP headers and HTTP cookies may be referred to as custom HTTP headers and custom HTTP cookies, respectively, to distinguish them from the headers and cookies included in the original app request. In some cases, the custom HTTP headers may comprise one or more application user attributes for the user associated with the login/request 601, where the one or more application user attributes are selected from a group consisting of a first name, a last name, an email address, group membership information, a role, a title, and a username. In some cases, the custom HTTP cookies may comprise at least one of a username, a unique identifier, an encrypted value, and a group. As noted above, the discovery module 617 may be configured to determine one or more differences between the information included in the original app request and the modified app request sent to the app 620. For example, the one or more differences may include the differences between the custom HTTP headers and the original HTTP headers, the custom cookies and the original HTTP cookies, or a combination thereof. In some examples, the discovery module 617 also determines if there are any differences in attributes between the original HTTP request and the modified HTTP request.

In the example shown, the optional device system 622 may be linked or associated with a device API 627, which may perform device verification, and the risk system 624 may be linked or associated with a risk API 637, which may retrieve a threat or risk score. In some embodiments, the risk API 637 and the device API 627 may link the risk system 624 and/or device system 622, respectively, to one or more applications (not shown), where the one or more applications may be third-party applications. In some cases, the one or more third party applications may be executed or hosted on another server (not shown). For instance, the device system 622 may interact with a third-party device verification application by making an API call using device API 627. The third-party device verification application may then process the information (e.g., a phone number, mobile device identifier, such as International Mobile Equipment Identity (IMEI), Mobile Equipment Identifier (MEID), Electronic Serial Number (ESN), International Mobile Subscriber Identity (IMSI), etc., and Media Access Control (MAC) address, to name a few non-limiting examples) received from the device system 622 (via the device API 627) and relay a response (e.g., Verified or Not verified, 1 or 0, Yes or No, etc.) to the device system 622. In some cases, the device system 622 may determine, from the response, if the user device associated with the login 601 is a recognized device or an unknown device. In some cases, the risk system 624 may also interact with a third-party risk verification application via the risk API 637. In some embodiments, the third-party risk and verification applications may be executed or hosted on the same or different third-party server(s). In some cases, device verification may serve as an added level of security (i.e., in addition to a username and password, for instance) and may be used to verify that the login/request 601 is coming from a recognized device (e.g., mobile device, laptop, computer, etc.) associated with an authorized user. In some cases, device verification may comprise transmitting a verification code over text (SMS), a phone call, an app, etc., to a recognized device associated with the user. The device system 622 may verify the device from which the login/request 601 was received upon the user inputting the same verification code. In some cases, the threat or risk score may be associated with a perceived or estimated threat level (e.g., for a user's identity), and may be based on one or more factors, including, but not limited to, time of day, day of week, geographic data, and/or IP address. For instance, a higher risk score may be assigned when the login 601 is during non-working hours (e.g., 3 AM) as compared to during working hours (e.g., 11 am). In another example, a lower risk score may be assigned when the login 601 is from a known IP address as opposed to an unknown IP address. In yet another example, a higher risk score may be assigned when the login 601 is from a geographic region (e.g., city, state, country, etc.) that the user has never logged in from before.

In some cases, the risk system 624 may authorize or flag the login 601 based in part on comparing the retrieved risk or threat score to a threshold. In one non-limiting example, the login/request 601 to access the app 620 may be denied based on the risk score exceeding the threshold (e.g., if it is determined that the user data is compromised based on validating one or more of the user identifier, the user credentials information, and any other identity data for the user). In another example, the user requesting the login 601 may be prompted to change their password (e.g., if the authentication policy states that the password should be updated every 3 months, 6 months, etc.) based on receiving a link or code on a registered device. In this case, the user may need to first click the link or input the code received on their registered device (e.g., a smartphone associated with the user) and then proceed to update their password. The user may then restart the login 601 process via the one or more runtime systems (e.g., authenticate system 621, access system 623, etc.). Alternatively, if the risk or threat score is under a threshold, the login 601 may be successful and a session 634 may be initiated (e.g., the user device may display a Welcome Screen with one or more links to access different apps or resources, including app 620).

The discovery module 617 may monitor the identity dataflow as it passes through the various identity infrastructure elements or runtime systems and determine the information used to establish an identity session 634 and gain access to the app 620. In some cases, the discovery module 617 may also identify where unsuccessful requests are routed to (e.g., routed to attributes system 626 so that user password can be updated). In some cases, an identity session may refer to a temporary and interactive information interchange between two or more communicating devices (e.g., a user device associated with login 601 and a server hosting app 620). Further, an established session may be a prerequisite for performing a connection-oriented communication. In some cases, a session may be initiated or established before data is transferred. As described above, initiation of identity session 634 may comprise displaying a successful login screen or welcome screen with one or more links to resources or apps authorized for use by the user, for instance, which may be indicative of a connection between the user device and the server hosting the app 620.

It should be noted that the identity dataflow 615 may interact with any of the runtime systems illustrated in FIG. 6, and in any order. In some other cases, the identity dataflow 615 may interact with different runtime systems in parallel (e.g., authenticate system 621 and device system 622 simultaneously). In other cases, the identity dataflow 615 may interact with the runtime systems in a first branch (e.g., the left branch in FIG. 6), followed by the runtime systems in the second branch (i.e., right branch). Either way, the discovery module 617 may detect the behavior and configurations of the various identity infrastructure elements and report the same to a centralized server (e.g., system 100) or discovery module user based on intercepting 616 the identity dataflow 615 within the identity infrastructure.

Figure 3:
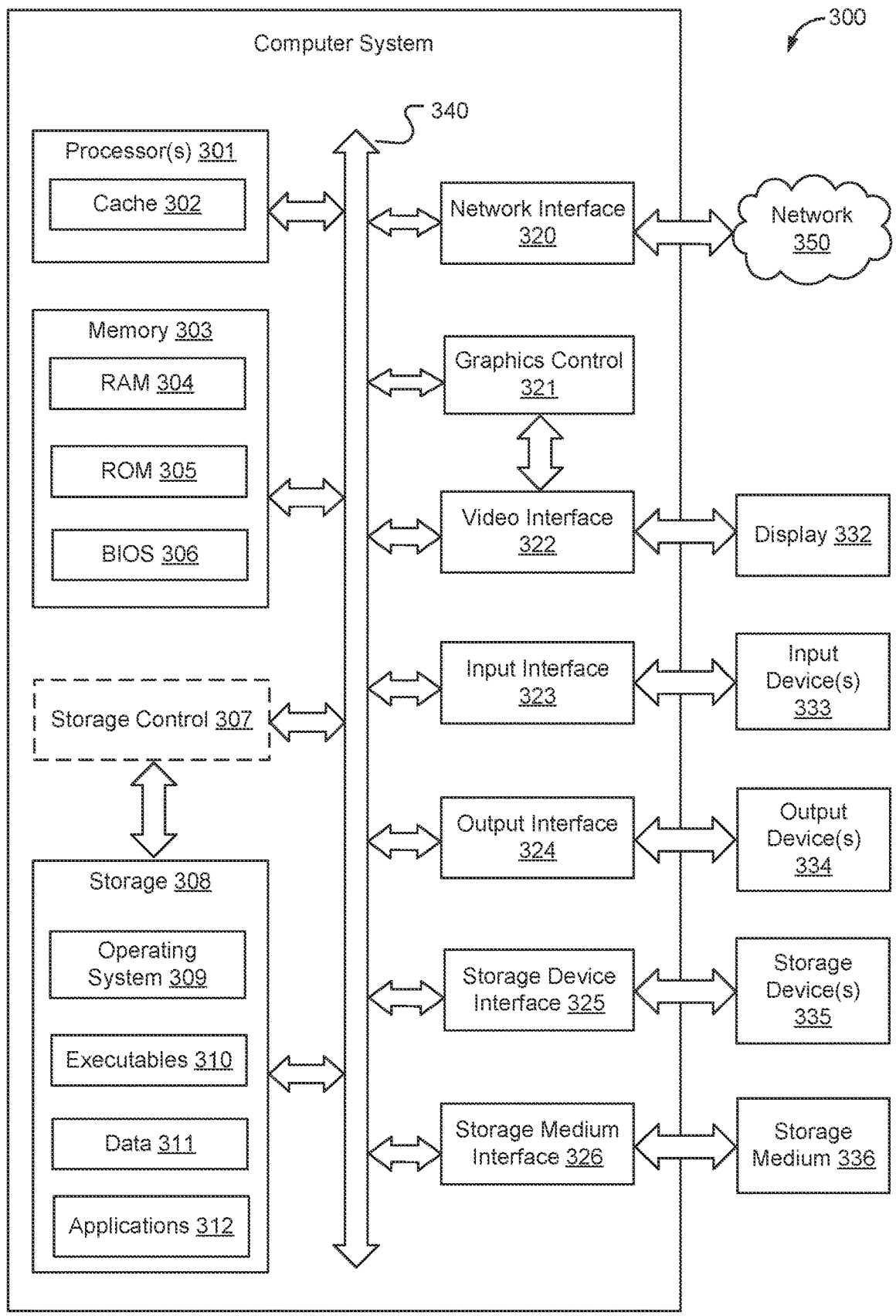
FIG. 3 illustrates a diagrammatic representation of a computer system configured for analyzing authentication and authorization requirements in an identity infrastructure, in accordance with various aspects of the disclosure.

FIG. 3 illustrates a diagrammatic representation of one embodiment of a computer system 300, within which a set of instructions can execute for causing a device to perform or execute any one or more of the aspects and/or methodologies of the present disclosure. The components in FIG. 3 are examples only and do not limit the scope of use or functionality of any hardware, software, firmware, embedded logic component, or a combination of two or more such components implementing particular embodiments of this disclosure. Some or all of the illustrated components can be part of the computer system 300. For instance, the computer system 300 can be a general-purpose computer (e.g., a laptop computer) or an embedded logic device (e.g., an FPGA), to name just two non-limiting examples.

Moreover, the components may be realized by hardware, firmware, software or a combination thereof. Those of ordinary skill in the art in view of this disclosure will recognize that if implemented in software or firmware, the depicted functional components may be implemented with processor-executable code that is stored in a non-transitory, processor-readable medium such as non-volatile memory. In addition, those of ordinary skill in the art will recognize that hardware such as field programmable gate arrays (FPGAs) may be utilized to implement one or more of the constructs depicted herein.

Computer system 300 includes at least a processor 301 such as a central processing unit (CPU) or a graphics processing unit (GPU) to name two non-limiting examples.

Any of the subsystems described throughout this disclosure could embody the processor 301. The computer system 300 may also comprise a memory 303 and a storage 308, both communicating with each other, and with other components, via a bus 340. The bus 340 may also link a display 332, one or more input devices 333 (which may, for example, include a keypad, a keyboard, a mouse, a stylus, etc.), one or more output devices 334, one or more storage devices 335, and various non-transitory, tangible computer-readable storage media 336 with each other and/or with one or more of the processor 301, the memory 303, and the storage 308. All of these elements may interface directly or via one or more interfaces or adaptors to the bus 340. For instance, the various non-transitory, tangible computer-readable storage media 336 can interface with the bus 340 via storage medium interface 326. Computer system 300 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 301 (or central processing unit(s) (CPU(s))) optionally contains a cache memory unit 302 for temporary local storage of instructions, data, or computer addresses. Processor(s) 301 are configured to assist in execution of computer-readable instructions stored on at least one non-transitory, tangible computer-readable storage medium. Computer system 300 may provide functionality as a result of the processor(s) 301 executing software embodied in one or more non-transitory, tangible computer-readable storage media, such as memory 303, storage 308, storage devices 335, and/or storage medium 336 (e.g., read only memory (ROM)). Memory 303 may read the software from one or more other non-transitory, tangible computer-readable storage media (such as mass storage device(s) 335, 336) or from one or more other sources through a suitable interface, such as network interface 320. Any of the subsystems herein disclosed could include a network interface such as the network interface 320. The software may cause processor(s) 301 to carry out one or more processes or one or more steps of one or more processes described or illustrated herein. Carrying out such processes or steps may include defining data structures stored in memory 303 and modifying the data structures as directed by the software. In some embodiments, an FPGA can store instructions for carrying out functionality as described in this disclosure. In other embodiments, firmware includes instructions for carrying out functionality as described in this disclosure.

The memory 303 may include various components (e.g., non-transitory, tangible computer-readable storage media) including, but not limited to, a random-access memory component (e.g., RAM 304) (e.g., a static RAM "SRAM", a dynamic RAM "DRAM, etc.), a read-only component (e.g., ROM 303), and any combinations thereof. ROM 303 may act to communicate data and instructions unidirectionally to processor(s) 301, and RAM 304 may act to communicate data and instructions bidirectionally with processor(s) 301. ROM 303 and RAM 304 may include any suitable non-transitory, tangible computer-readable storage media. In some instances, ROM 303 and RAM 304 include non-transitory, tangible computer-readable storage media for carrying out any of the method(s) disclosed herein, including at least in relation to FIGS. 2-6. In one example, a basic input/output system (BIOS) 306, including basic routines that help to transfer information between elements within computer system 300, such as during start-up, may be stored in the memory 303.

Fixed storage 308 is connected bi-directionally to processor(s) 301, optionally through storage control unit 307. Fixed storage 308 provides additional data storage capacity and may also include any suitable non-transitory, tangible computer-readable media described herein. Storage 308 may be used to store operating system 309, EXECs 310 (executables), data 311, API 312, and the like. Often, although not always, storage 308 is a secondary storage medium (such as a hard disk) that is slower than primary storage (e.g., memory 303). Storage 308 can also include an optical disk drive, a solid-state memory device (e.g., flash-based systems), or a combination of any of the above. Information in storage 308 may, in appropriate cases, be incorporated as virtual memory in memory 303.

In one example, storage device(s) 335 may be removably interfaced with computer system 300 (e.g., via an external port connector (not shown)) via a storage device interface 325. Particularly, storage device(s) 335 and an associated machine-readable medium may provide nonvolatile and/or volatile storage of machine-readable instructions, data structures, program modules, and/or other data for the computer system 300. In one example, software may reside, completely or partially, within a machine-readable medium on storage device(s) 335. In another example, software may reside, completely or partially, within processor(s) 301.

Bus 340 connects a wide variety of subsystems. Herein, reference to a bus may encompass one or more digital signal lines serving a common function, where appropriate. Bus 340 may be any of several types of bus structures including, but not limited to, a memory bus, a memory controller, a peripheral bus, a local bus, and any combinations thereof, using any of a variety of bus architectures. As an example, and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 300 may also include an input device 333. In one example, a user of computer system 300 may enter commands and/or other information into computer system 300 via input device(s) 333. Examples of an input device(s) 333 include, but are not limited to, an alpha-numeric input device (e.g., a keyboard), a pointing device (e.g., a mouse or touchpad), a touchpad, a touch screen and/or a stylus in combination with a touch screen, a joystick, a gamepad, an audio input device (e.g., a microphone, a voice response system, etc.), an optical scanner, a video or still image capture device (e.g., a camera), and any combinations thereof. Input device(s) 333 may be interfaced to bus 340 via any of a variety of input interfaces 323 (e.g., input interface 323) including, but not limited to, serial, parallel, game port, USB, FIREWIRE, THUNDERBOLT, or any combination of the above.

In particular embodiments, when computer system 300 is connected to network 350, computer system 300 may communicate with other devices, such as mobile devices and enterprise systems, connected to network 350. Communications to and from computer system 300 may be sent through network interface 320. For example, network interface 320 may receive incoming communications (such as requests or responses from other devices) in the form of one or more packets (such as Internet Protocol (IP) packets) from network 330, and computer system 300 may store the incoming communications in memory 303 for processing. Computer system 300 may similarly store outgoing communications (such as requests or responses to other devices) in the form of one or more packets in memory 303 and communicated to network 350 from network interface 320. Processor(s) 301 may access these communication packets stored in memory 303 for processing.

Examples of the network interface 320 include, but are not limited to, a network interface card, a modem, and any combination thereof. Examples of a network 350 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 350, may employ a wired and/or a wireless mode of communication. In general, any network topology may be used.

Information and data can be displayed through a display 332. Examples of a display 332 include, but are not limited to, a liquid crystal display (LCD), an organic liquid crystal display (OLED), a cathode ray tube (CRT), a plasma display, and any combinations thereof. The display 332 can interface to the processor(s) 301, memory 303, and fixed storage 308, as well as other devices, such as input device(s) 333, via the bus 340. The display 332 is linked to the bus 340 via a video interface 322, and transport of data between the display 332 and the bus 340 can be controlled via the graphics control 321.

In addition to a display 332, computer system 300 may include one or more other peripheral output devices 334 including, but not limited to, an audio speaker and/or a printer. Such peripheral output devices may be connected to the bus 340 via an output interface 324. Examples of an output interface 324 include, but are not limited to, a serial port, a parallel connection, a USB port, a FIREWIRE port, a THUNDERBOLT port, and any combinations thereof.

In addition, or as an alternative, computer system 300 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a non-transitory, tangible computer-readable medium may encompass a circuit (such as an IC) storing software for execution, a circuit embodying logic for execution, or both, where appropriate. The present disclosure encompasses any suitable combination of hardware, software, or both.

Those of skill in the art will understand that information and signals may be represented using any of a variety of different technologies and techniques. Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, a software module implemented as digital logic devices, or in a combination of these. A software module may reside in RAM memory, flash memory, ROM memory, EPROM memory, EEPROM memory, registers, hard disk, a removable disk, a CD-ROM, or any other form of non-transitory, tangible computer-readable storage medium known in the art. An exemplary non-transitory, tangible computer-readable storage medium is coupled to the processor such that the processor can read information from, and write information to, the non-transitory, tangible computer-readable storage medium. In the alternative, the non-transitory, tangible computer-readable storage medium may be integral to the processor. The processor and the non-transitory, tangible computer-readable storage medium may reside in an ASIC. The ASIC may reside in a user terminal. In the alternative, the processor and the non-transitory, tangible computer-readable storage medium may reside as discrete components in a user terminal. In some embodiments, a software module may be implemented as digital logic components, such as those in an FPGA, once programmed with the software module.

It is contemplated that one or more of the components or subcomponents described in relation to the computer system 300 shown in FIG. 3 such as, but not limited to, the network 350, processor 301, memory, 303, etc., may comprise a cloud computing system. In one such system, front-end systems such as input devices 333 may provide information to back-end platforms such as servers (e.g., computer systems 300) and storage (e.g., memory 303). Software (i.e., middleware) may enable interaction between the front-end and back-end systems, with the back-end system providing services and online network storage to multiple front-end clients. For example, a software-as-a-service (SAAS) model may implement such a cloud-computing system. In such a system, users may operate software located on back-end servers through the use of a front-end software application such as, but not limited to, a web browser.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for analyzing authentication and authorization requirements in an identity infrastructure, the system comprising:
one or more hardware processors configured by machine-readable instructions to:
intercept, at a server, a first request to access an application in the identity infrastructure, wherein the first request is received from a first user device;
transmit, from the server, one or more of the first request and a modified version of the first request to the application;
intercept, at the server, a response from the application, based at least in part on the transmission;
display, via at least one interface, an analysis of one or more of the first request, the modified version of the first request, and the response, wherein the analysis comprises determining at least one of: requirements for application authentication and authorization, one or more identity protocols utilized by the application, one or more identity techniques utilized by the application, whether application meets predetermined compliance standards, and whether any user-defined security requirements have been implemented; and
capture a second request to access the application, wherein the second request comprises the modified version of the first request and includes one or more identity dependencies received from an identity and access management (IAM) system;
wherein the transmission comprises transmitting the second request to the application; and
wherein intercepting the response comprises intercepting the response from one of the IAM system or the application.

2. The system of claim 1, wherein the identity dependencies comprise one or more of identity attributes received from an external attribute source, request and response headers, request and response bodies, request and response methods, and cookies; and
wherein the at least one interface comprises one or more of a graphical user interface and an application programming interface.

3. The system of claim 2, wherein,
the identity attributes comprise one or more of an email address, a phone number, a residential address, a job title, an employer department, and an employee ID;
the external attribute source comprise one or more of a lightweight directory access protocol (LDAP) associated with the application, a database, and a web service;
the request and response headers comprise one or more of modifying and adding hypertext transfer protocol (HTTP) headers;
the cookies comprise or more of modifying and adding HTTP cookies;
the request and response bodies comprise one or more of modifying and adding HTTP request bodies; and
the request and response methods comprise an HTTP request method.

4. The system of claim 3, wherein,
the identity dependencies comprise the requirements for authentication and authorization;
the HTTP headers comprise custom HTTP headers;
the HTTP cookies comprise custom HTTP cookies; and the HTTP request method comprises at least one of a GET method, a HEAD method, a POST method, a PUT method, a DELETE method, a CONNECT method, a TRACE method, and a PATCH method.

5. The system of claim 4, wherein at least one of the identity dependencies and the requirements for authentication and authorization comprises one or more differences between the second request and the first request, wherein the one or more differences between the second request and the first request include at least one of addition of the custom HTTP headers, addition of the custom HTTP cookies, and modification of one or more attributes in one or more of the first request and the second request.

6. A method for analyzing authentication and authorization requirements in an identity infrastructure, the method comprising:
   intercepting, at a server, a first request to access an application in the identity infrastructure, wherein the first request is received from a first user device;
   transmitting, from the server, one or more of the first request and a modified version of the first request to the application;
   intercepting, at the server, a response, based at least in part on the transmission;
   displaying, via at least one interface, an analysis of one or more of the first request, the modified version of the first request, and the response, wherein the analysis comprises determining at least one of; requirements for application authentication and application authorization, one or more identity protocols utilized by the application, one or more identity techniques utilized by the application, whether application meets predetermined compliance standards, and whether any user-defined security requirements have been implemented; and
   capturing, by the server, a second request to access the application, wherein the second request comprises the modified version of the first request and includes one or more identity dependencies received from an identity and access management (IAM) system;
   wherein the transmitting comprises transmitting the second request to the application; and
   wherein intercepting the response comprises intercepting the response from one of the IAM system or the application.

7. The method of claim 6, wherein the identity dependencies comprise identity attributes received from an external attribute source, request headers, response headers, request bodies, response bodies, request methods, response methods, and cookies; and
   wherein the at least one interface comprises one or more of a graphical user interface and an application programming interface.

8. The method of claim 7, wherein,
   the identity attributes comprise one or more of an email address, a phone number,
   a residential address, a job title, an employer department, and an employee ID;
   the external attribute source comprise one or more of a lightweight directory access protocol (LDAP) associated with the application, a database, and a web service;
   the request headers and response headers comprise one or more of modifying and adding hypertext transfer protocol (HTTP) headers;
   the cookies comprise one or more of modifying and adding HTTP cookies;
   the request bodies and response bodies comprise one or more of modifying and adding HTTP request bodies; and
   the request methods and response methods comprise an HTTP method.

9. The method of claim 8, wherein,
   the identity dependencies comprise the requirements for application authentication and application authorization;
   the HTTP headers comprise one or more of status codes, redirect locations, query parameters, and one or more custom HTTP headers;
   the HTTP cookies comprise custom HTTP cookies; and
   the HTTP method comprises at least one of a GET method, a HEAD method, a POST method, a PUT method, a DELETE method, a CONNECT method, a TRACE method, and a PATCH method.

10. The method of claim 9, wherein,
    the requirements for application authentication and authorization comprise multi-factor authentication and rules governing access of resources associated with the application;
    the multi-factor authentication comprises one or more of a username, a password, biometric information, and Single Sign-On (SSO) policies;
    the custom HTTP headers further comprise one or more application user attributes for one or more users, wherein the one or more application user attributes are selected from a group consisting of a first name, a last name, an email address, group membership information, a role, a title, and a username; and
    the custom HTTP cookies comprise at least one of a username and a group.

11. The method of claim 8, wherein at least one of the identity dependencies and the requirements for application authentication and authorization comprises one or more differences between the second request and the first request, wherein the one or more differences between the second request and the first request include at least one of addition of the custom HTTP headers, addition of the custom cookies, and modification of one or more attributes in one or more of the first request and the second request.

12. The method of claim 8, wherein,
    the one or more identity protocols and identity techniques utilized by the application comprise one or more of,
    Security Assertion Markup Language (SAML),
    OpenID Connect (OIDC),
    Kerberos, and
    header-based authentication;
    the predetermined compliance standards comprise at least one of regulatory standards and customer-defined security requirements, the regulatory standards including at least one of,
    Payment Card Industry (PCI) Data Security Standard,
    Health Insurance Portability and Accountability Act (HIPAA),
    System and Organization Controls (SOC2) compliance standard, and
    the use of Transport Layer Security (TLS); and
    the customer-defined security requirements comprise at least one of,
    multi-factor authentication, and
    a zero-trust security model.

13. The method of claim 6, further comprising transforming the first request from a first format to a second format, wherein the second format is different than the first format and comprises one or more of request headers, response headers, request bodies, response bodies, request methods, response methods, and cookies.

14. The method of claim 6, wherein the server comprises a webserver, the webserver comprising at least one of: an Apache server; an IBM HTTP server (IHS); an Oracle HTTP Server (OHS); and a NGINX server.

15. The method of claim 6, wherein, the response comprises a response from the IAM system blocking the first request from reaching the application, and wherein the first request comprises an unmodified request received from the first user device.

16. The method of claim 6, wherein, determining the requirements for application authentication and application authorization comprises:
   analyzing one or more of application authentication requirements and application authorization requirements in the identity infrastructure for migration from the IAM system to another IAM system; and
   the another IAM system comprises one or more of:
      an IAM system utilizing a standard identity protocol, the standard identity protocol comprising at least one of OpenID Connect (OIDC), Security Assertion Markup Language (SAML), and WebAuthn;
      an IAM system supporting multi-factor authentication; and
      an IAM system that is not supported by a third-party, wherein the third-party comprises a vendor.

17. The method of claim 16, wherein the migration from the IAM system to the another IAM system comprises using a third-party system to pass, from the IAM system to the another IAM system, one or more of the:
   identity dependencies;
   requirements for application authentication and authorization;
   one or more identity protocols utilized by the application;
   one or more identity techniques utilized by the application;
   predetermined compliance standards; and
   user-defined security requirements.

18. A non-transient computer-readable storage medium having instructions embodied thereon, the instructions being executable by one or more processors to perform a method for analyzing authentication and authorization requirements in an identity infrastructure, the method comprising:
   intercepting, at a server, a first request to access an application in the identity infrastructure, wherein the first request is received from a first user' device;
   transmitting, from the server, one or more of the first request and a modified version of the first request to the application;
   intercepting, at the server, a response from the application, based at least in part on the transmission;
   displaying, via at least one interface, an analysis of one or more of the first request, the modified version of the first request, and the response, wherein the analysis comprises determining at least one of: requirements for application authentication, requirements for application authorization, one or more identity protocols utilized by the application, one or more identity techniques utilized by the application, whether application meets predetermined compliance standards, and whether any user-defined security requirements have been implemented; and
   capturing, by the server, a second request to access the application, wherein the second request comprises the modified version of the first request and includes one or more identity dependencies received from an identity and access management (IAM) system;
   wherein the transmitting comprises transmitting the second request to the application; and
   wherein intercepting the response comprises intercepting the response from one of the IAM system or the application.

* * * * *